United States Patent [19]
Street

[11] Patent Number: 5,712,732
[45] Date of Patent: Jan. 27, 1998

[54] AUTOSTEREOSCOPIC IMAGE DISPLAY ADJUSTABLE FOR OBSERVER LOCATION AND DISTANCE

[76] Inventor: Graham Stewart Brandon Street, Impstone House, Pamber Road, Silchester, Reading, Berkshire RG7 2NU, United Kingdom

[21] Appl. No.: 513,787

[22] PCT Filed: Mar. 2, 1994

[86] PCT No.: PCT/GB94/00405

§ 371 Date: Aug. 29, 1995

§ 102(e) Date: Aug. 29, 1995

[87] PCT Pub. No.: WO92/20875

PCT Pub. Date: Sep. 15, 1994

[30] Foreign Application Priority Data

| Mar. 3, 1993 | [GB] | United Kingdom | 9304279 |
| Apr. 14, 1993 | [GB] | United Kingdom | 9307638 |
| Jul. 13, 1993 | [GB] | United Kingdom | 9314419 |
| Nov. 2, 1993 | [GB] | United Kingdom | 9322579 |
| Nov. 24, 1993 | [GB] | United Kingdom | 9324141 |
| Jan. 5, 1994 | [GB] | United Kingdom | 9400097 |

[51] Int. Cl.⁶ ............................................ G02B 27/14
[52] U.S. Cl. ............................................................ 359/630
[58] Field of Search ................................. 359/630, 631, 359/633, 636, 458, 462, 466, 467, 468; 355/22; 396/330, 340

[56] References Cited

U.S. PATENT DOCUMENTS

| Re. 35,029 | 8/1995 | Sandor et al. | 355/22 |
| 3,834,785 | 9/1974 | Kimura | 359/12 |
| 4,641,178 | 2/1987 | Street | 358/3 |

(List continued on next page.)

FOREIGN PATENT DOCUMENTS

| 0118449 | 11/1987 | European Pat. Off. |
| 0354851 | 2/1990 | European Pat. Off. |
| 0477888 | 4/1992 | European Pat. Off. |
| 0493651 | 7/1992 | European Pat. Off. |
| 0576106 | 12/1993 | European Pat. Off. |
| 575257 | 12/1993 | European Pat. Off. ........... 359/630 |

OTHER PUBLICATIONS

Schwartz, Head Tracking Stereoscopic Display, Oct. 15–17, 1995, pp. 141–144.

Schwartz, Alfred, 1985 International Display Research Conference, Oct. 15, 1985, San Diego, CA, pp. 141–144, "Head Tracking Stereoscopic Display".

(List continued on next page.)

*Primary Examiner*—David C. Nelms
*Assistant Examiner*—Ricky Mack

[57] ABSTRACT

Apparatus and method for the alignment of images in which, typically, two perspective views are provided. The observer's head location is detected and each of the views is presented to the respectively correct eye to provide a stereoscopic image. A retro-reflective marker worn by the observer removes the need for the observer to wear special viewing devices, whilst providing an infrared imaging system with a way to locate the observer's head. Image content may be driven by the observer's viewpoint. The two perspectives may be presented simultaneously using conventional display elements. A tapered lenticular structure provides a way to adapt to changes in the observer's distance from the display. Alternatively, each perspective image may be rapidly sequenced, either as two complete single images, or a sequence of suitably arranged compositions of the two. The infrared source used in the head tracking apparatus is modulated to aid image processing. The modulated source may also be used to synchronize a stereoscopic viewing device, switching views on a field sequential basis. Inter alia, the invention has applications in minimally invasive surgery, remote handling, virtual reality, teleconferencing and computer aided design and visualization.

69 Claims, 12 Drawing Sheets

U.S. PATENT DOCUMENTS

| | | | |
|---|---|---|---|
| 4,649,425 | 3/1987 | Pund | 358/88 |
| 4,872,750 | 10/1989 | Morishita | 353/7 |
| 5,287,437 | 2/1994 | Deering | 395/127 |
| 5,414,544 | 5/1995 | Aoyagi | 359/53 |
| 5,467,205 | 11/1995 | Kuba | 359/40 |
| 5,477,385 | 12/1995 | Freeman | 359/629 |
| 5,493,427 | 2/1996 | Nomura | 359/40 |
| 5,583,695 | 12/1996 | Dobrusskin | 359/633 |

OTHER PUBLICATIONS

Eichenlaub, J. B., Proceedings on the SPIE: Stereoscopic Displays and Applications IV, vol. 1915, Feb. 1, 1993, San Jose, CA, pp. 177–186, "Developments in Autostereoscopic Technology at Dimension Technologies Inc".

Okoshi, Takanori, *Three Dimensional Imaging Techniques*, pp. 364–369, Academic Press, 1976.

Isono, Haruo, "Autostereoscopic 3–D Display Using LCD–Generated Active Barrier–Strip", Proceedings on 22nd Image Technology Conference, pp. 103–106, 1991.

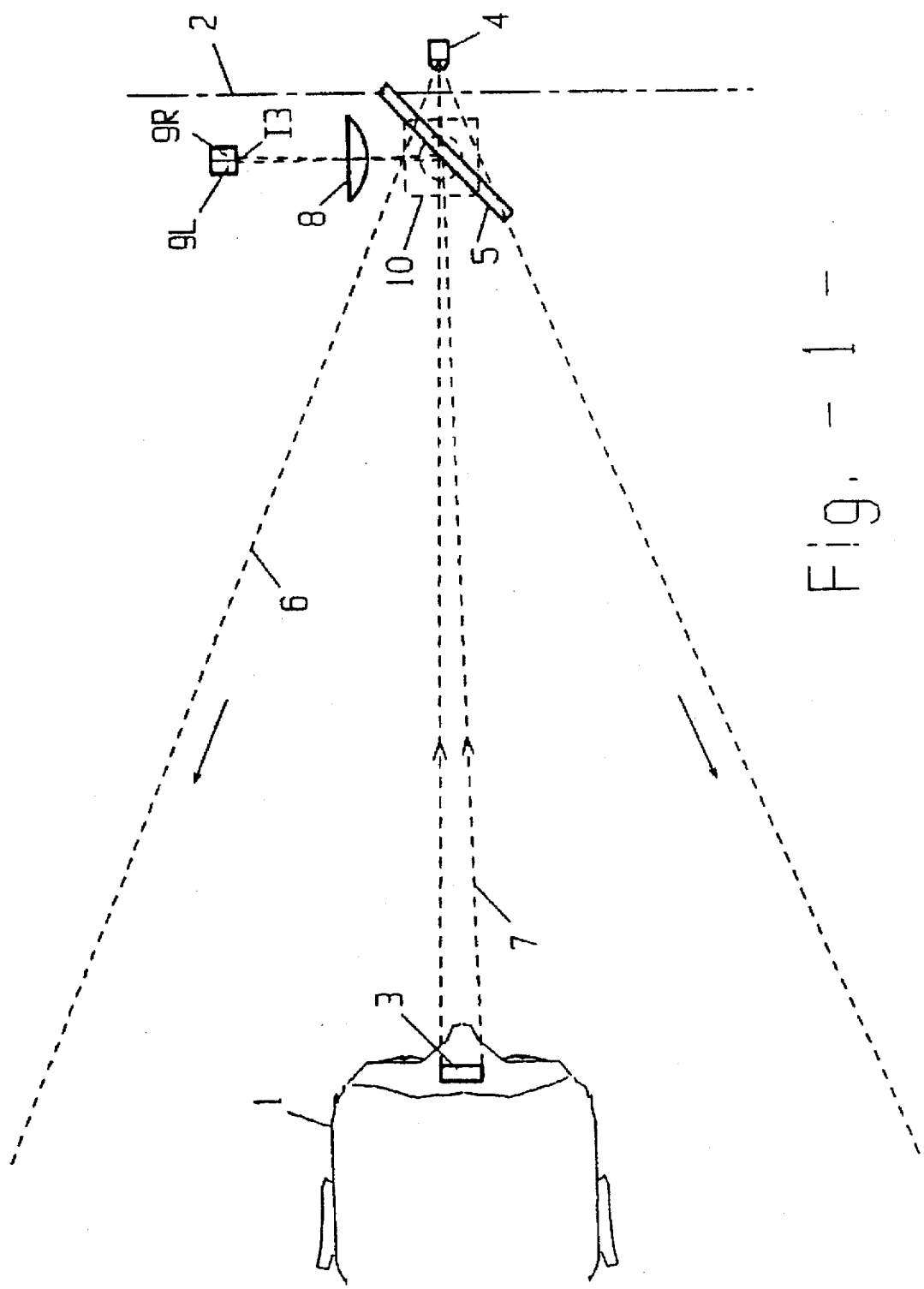
Fig. - 1 -

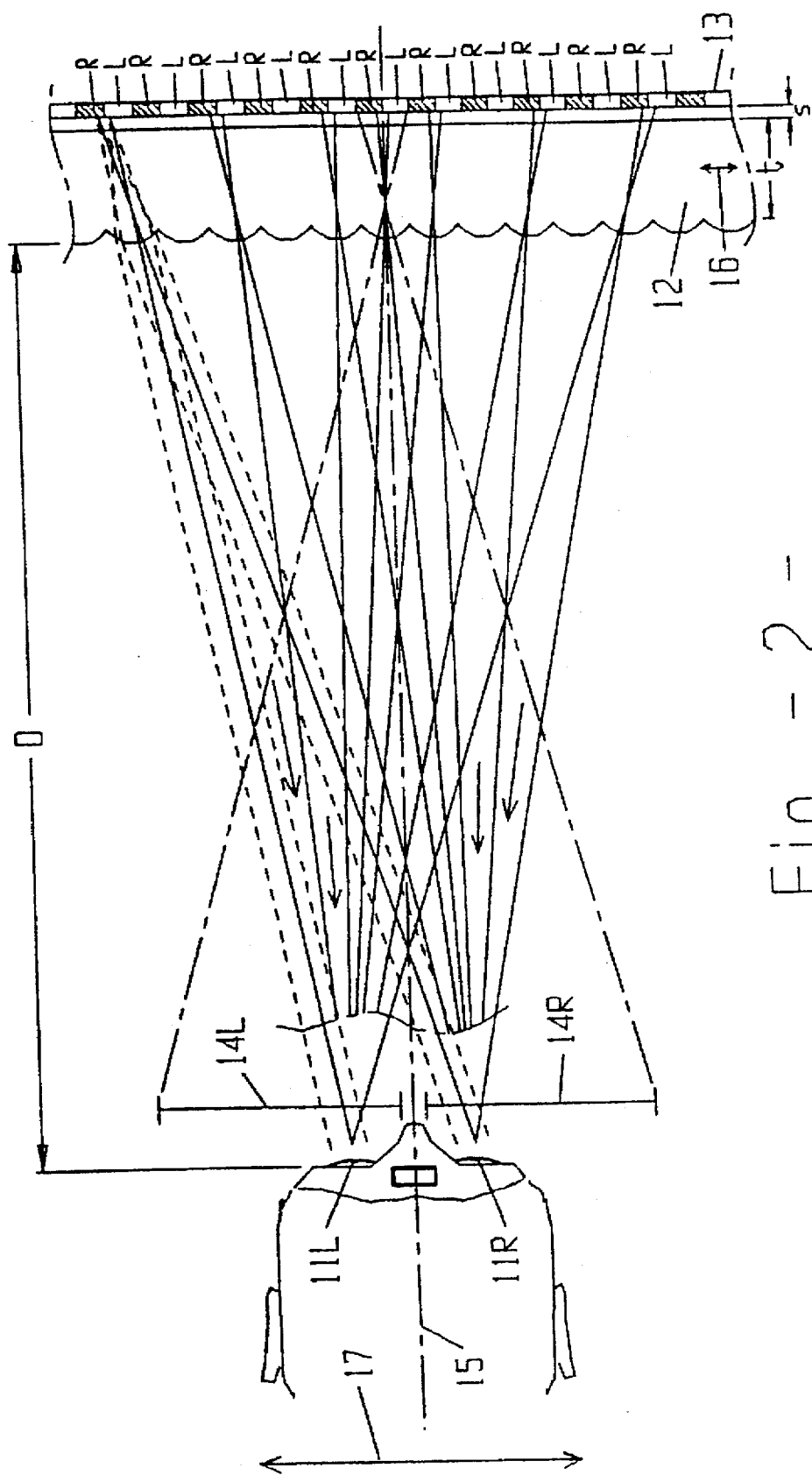
Fig. - 2 -

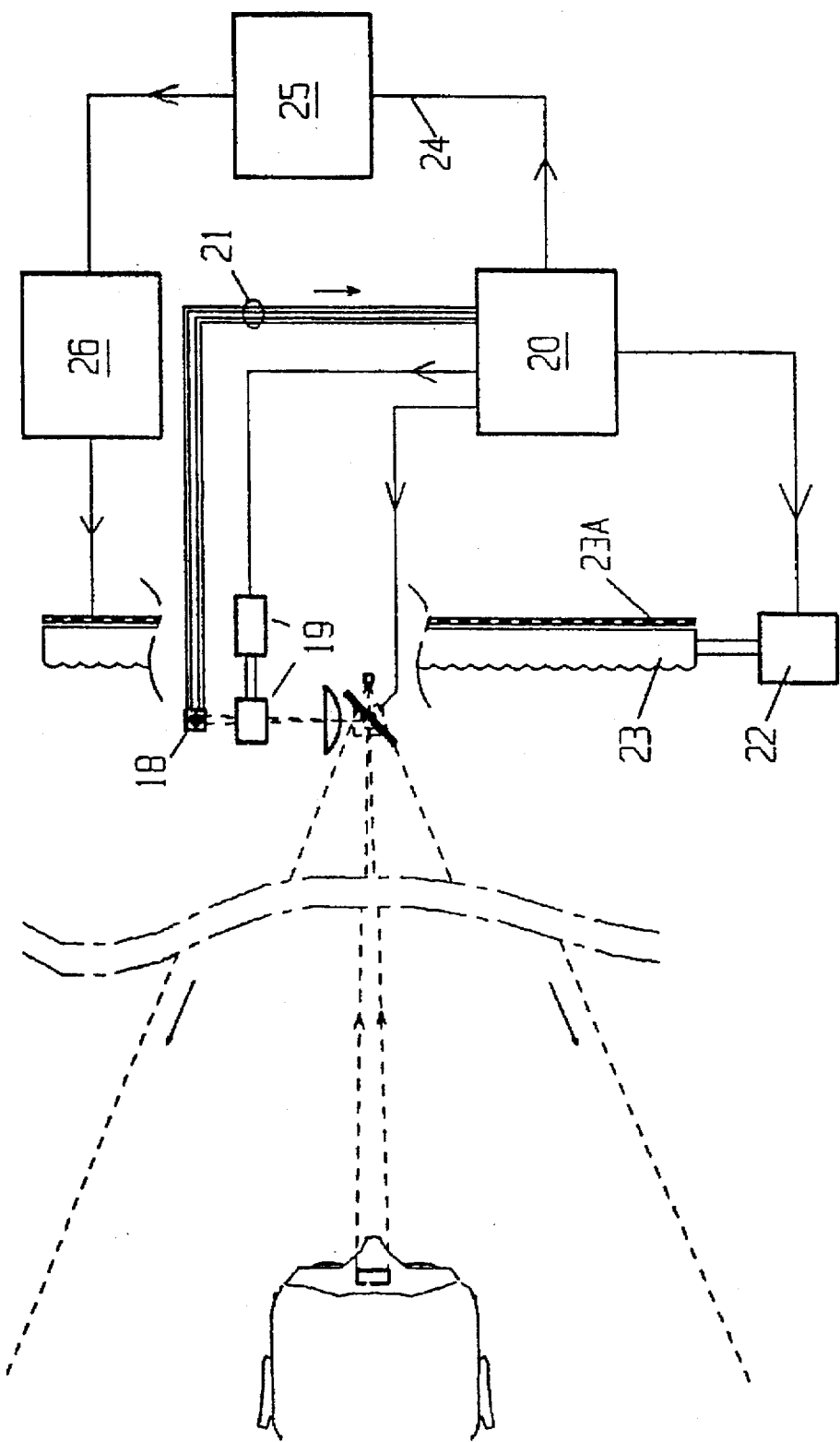

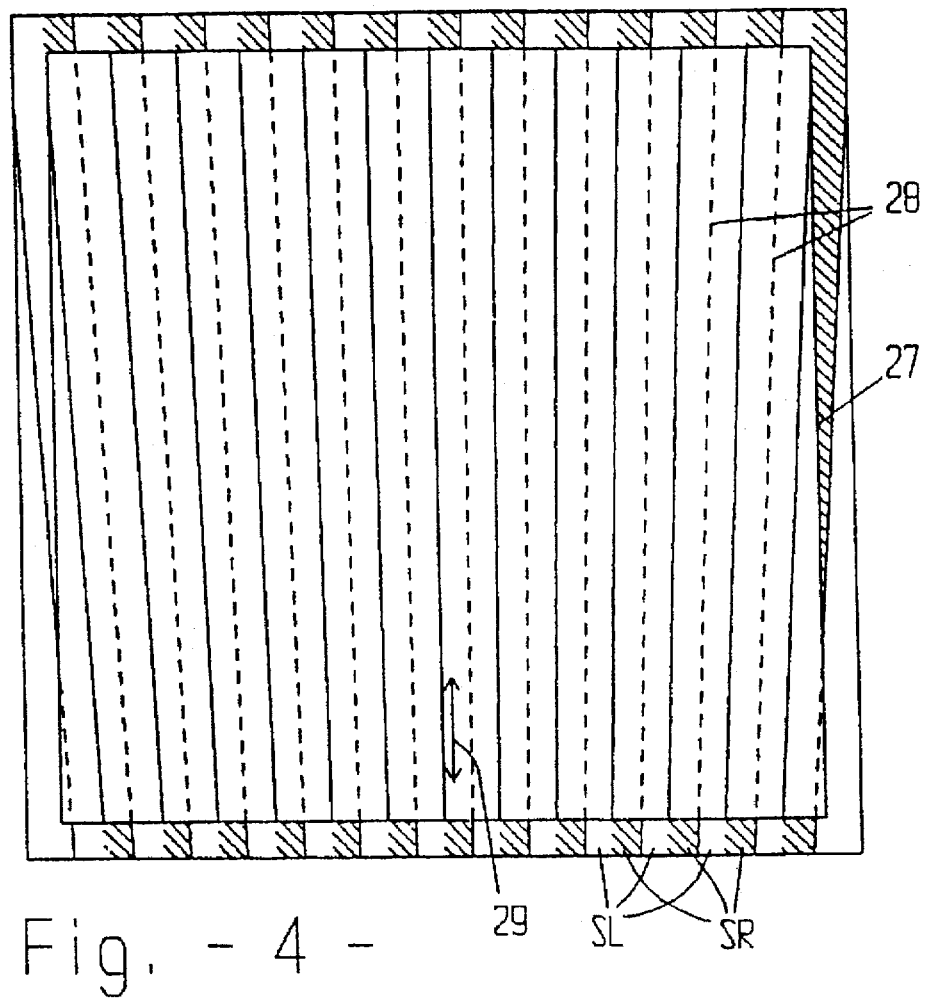
Fig. - 4 -
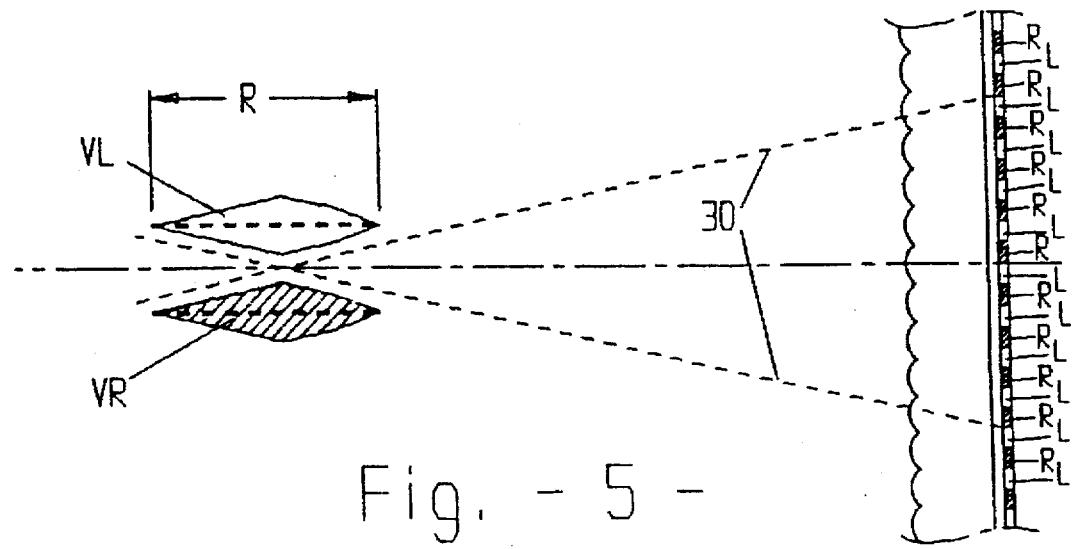
Fig. - 5 -

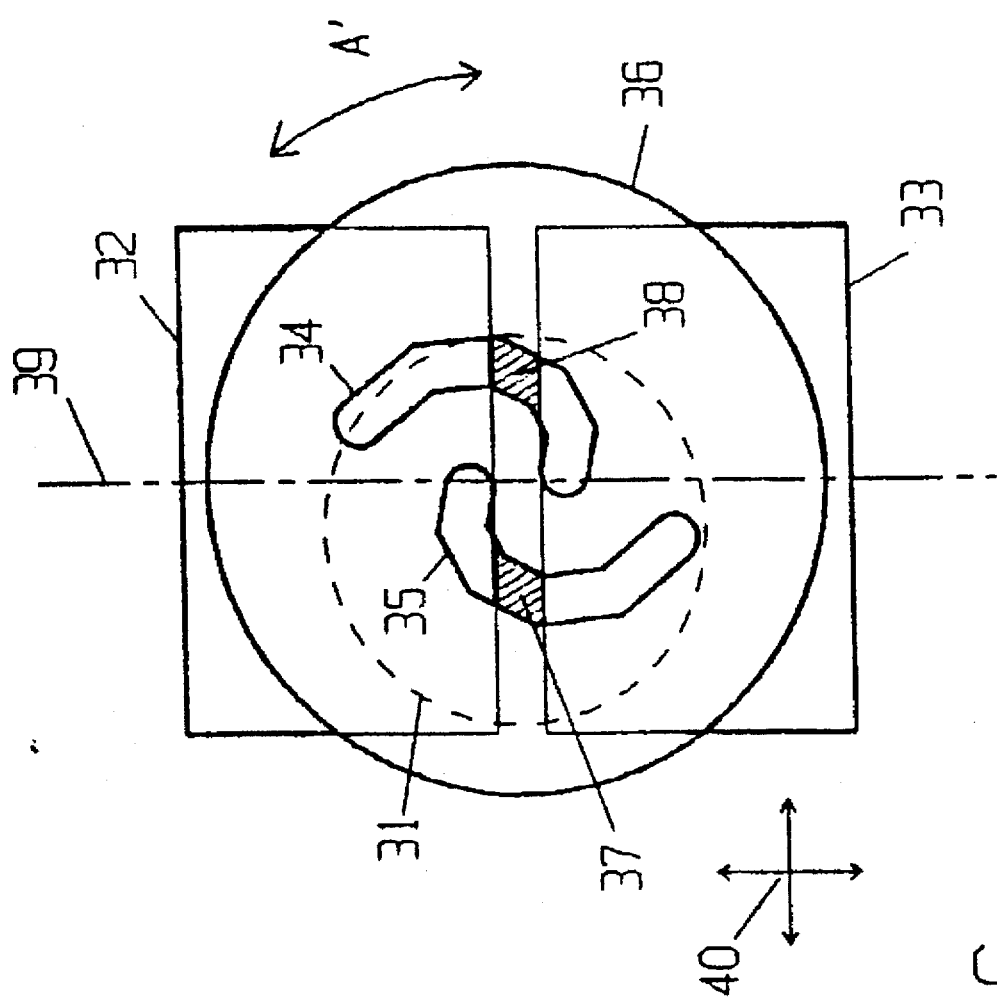
Fig.-6-

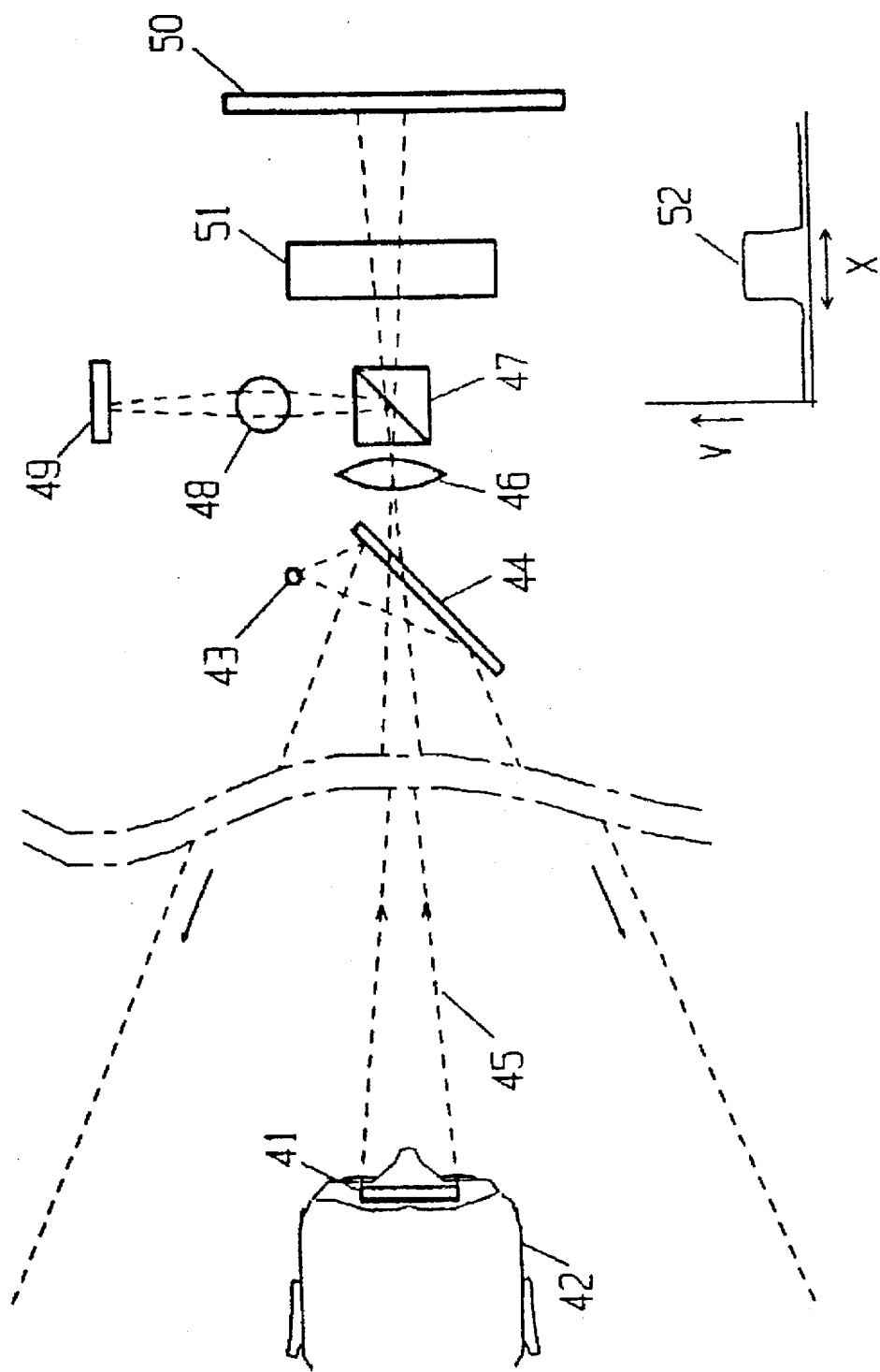

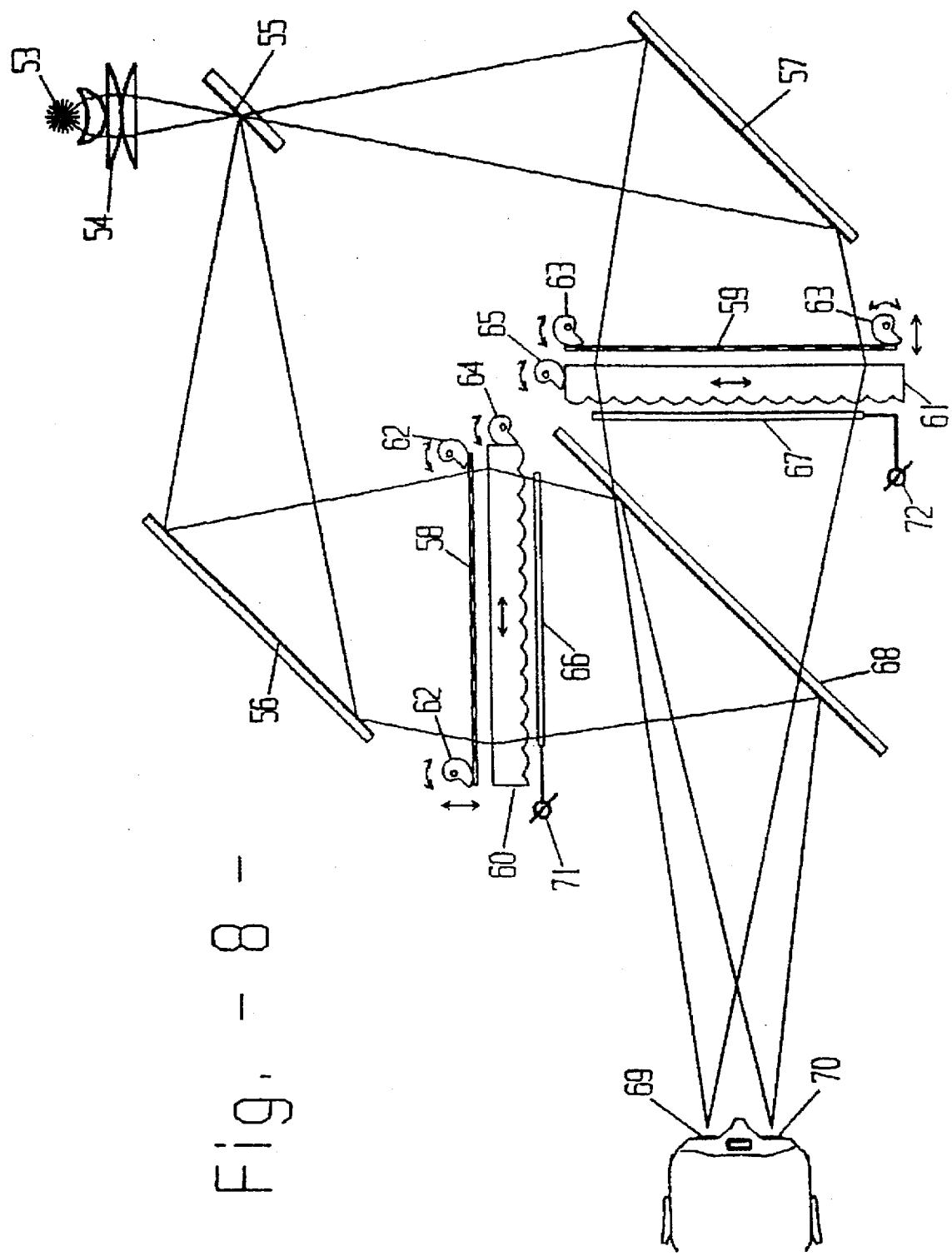
Fig.-8-

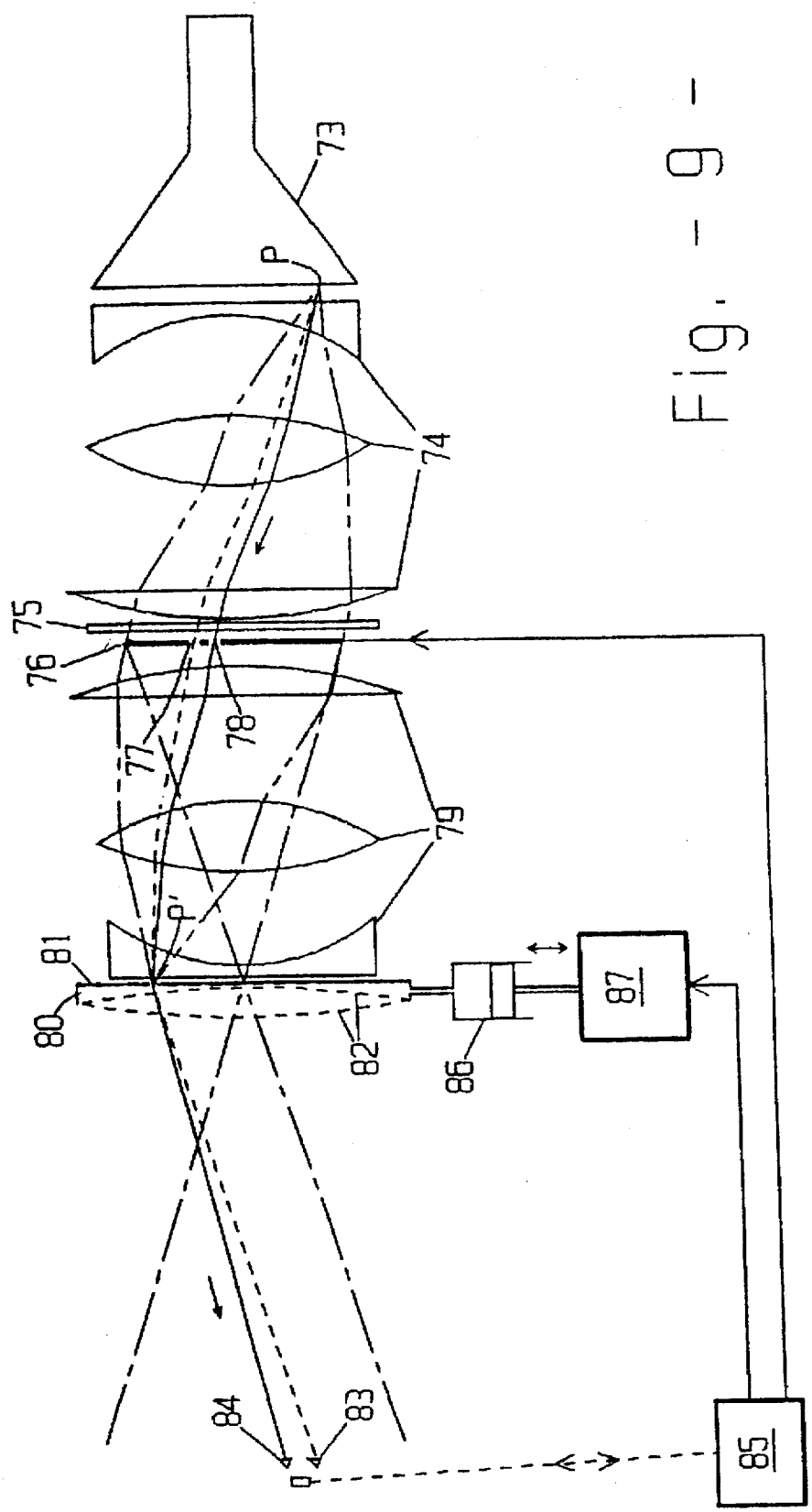
Fig. - 9 -

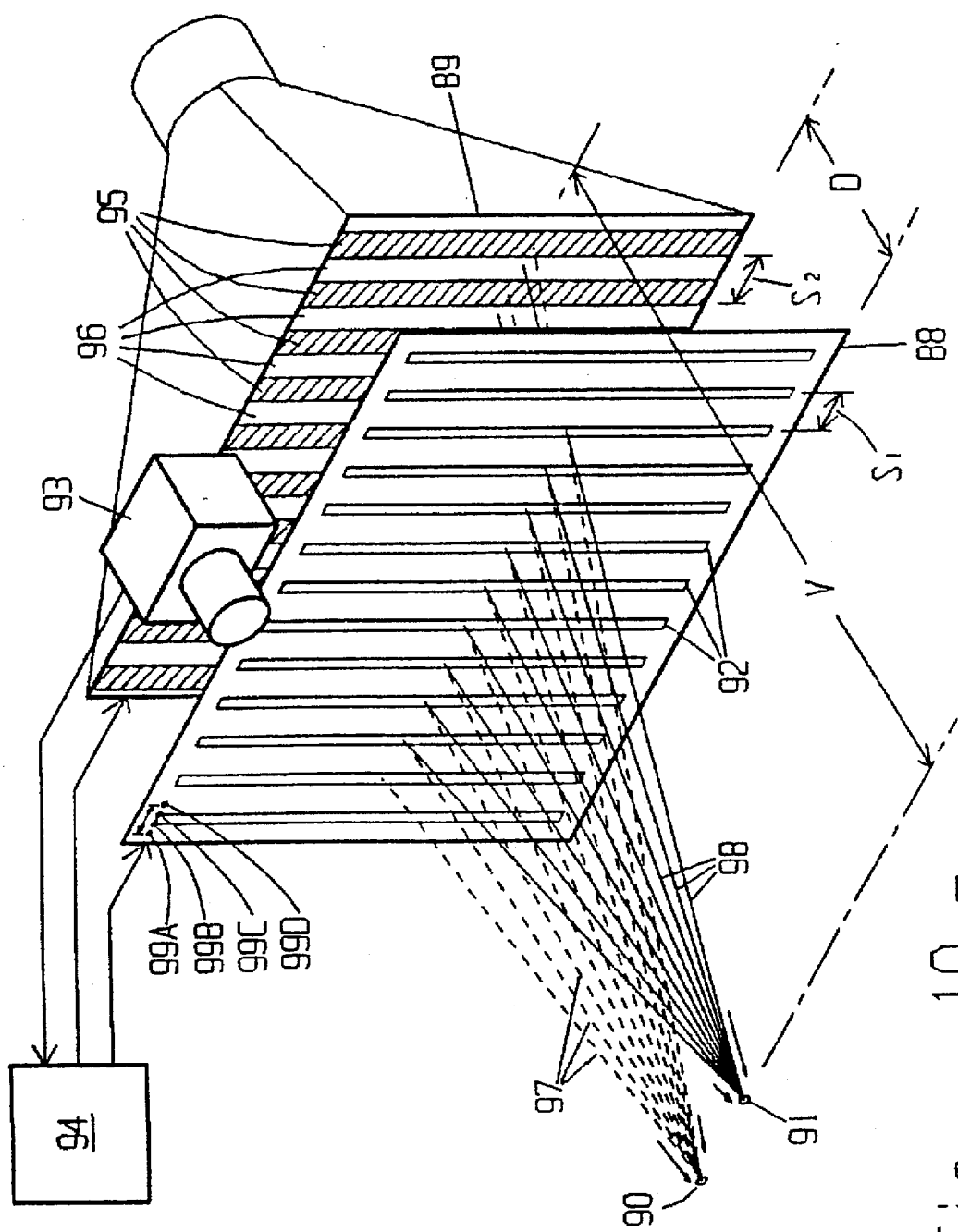

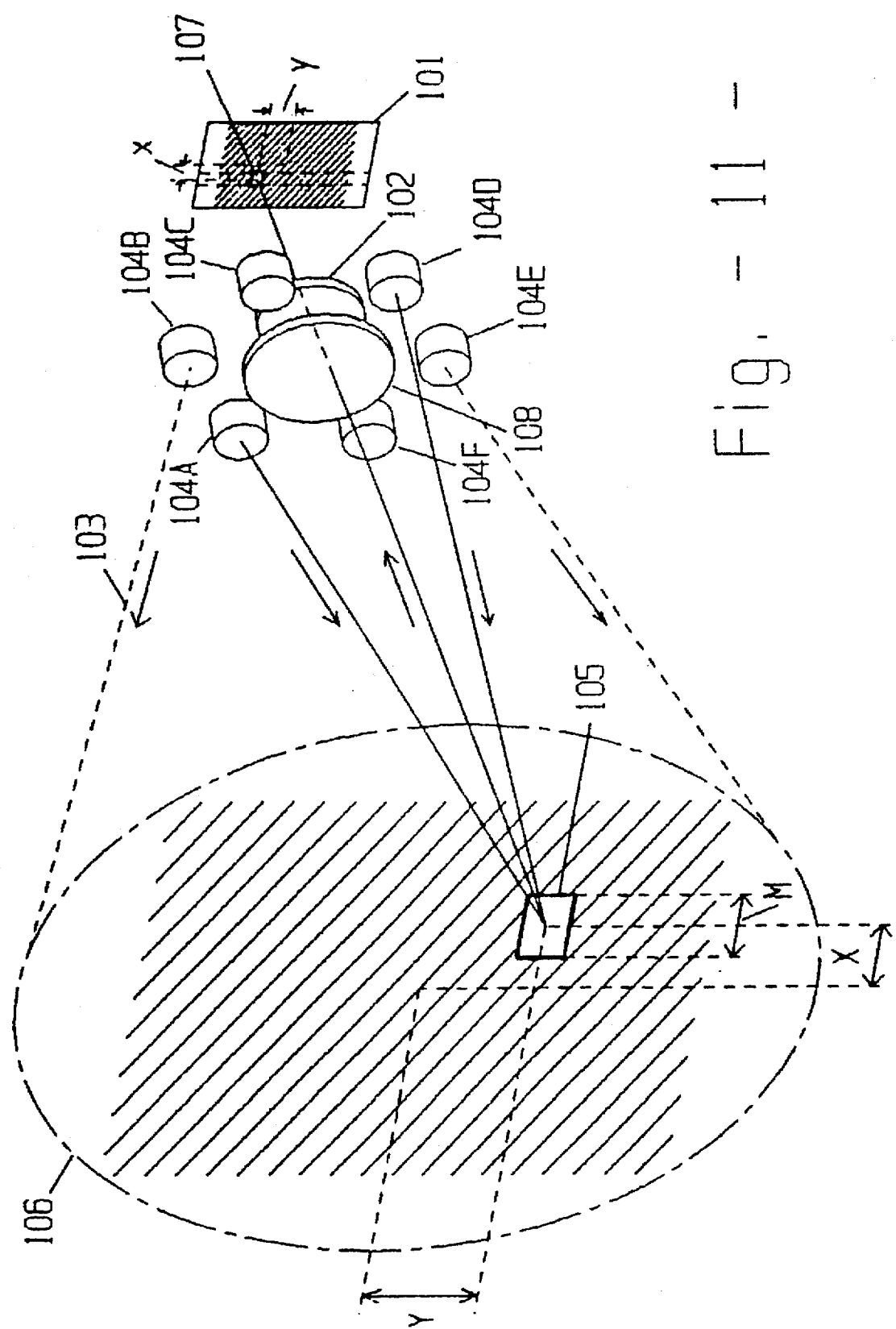
Fig. - 11 -

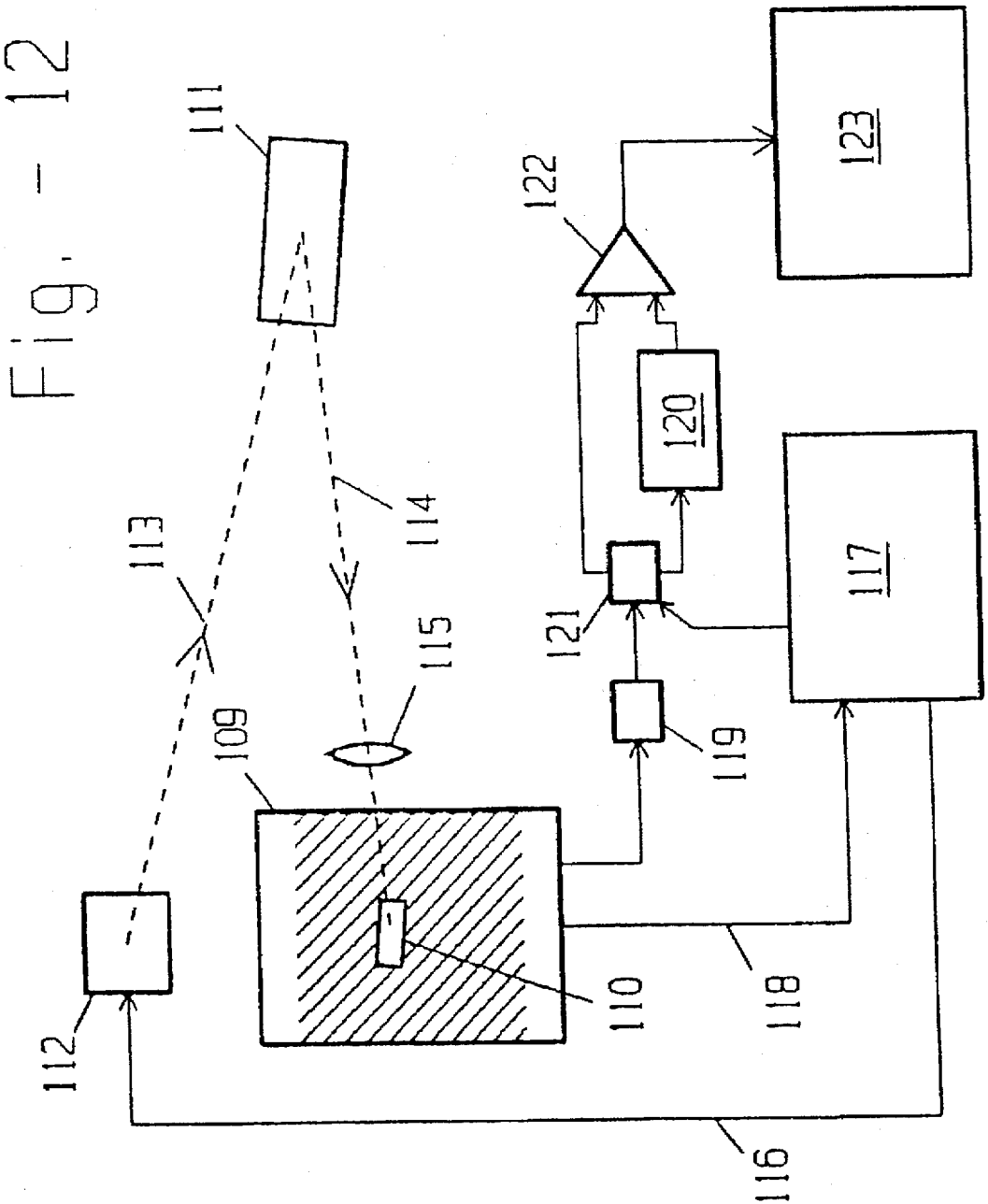
Fig. -12-

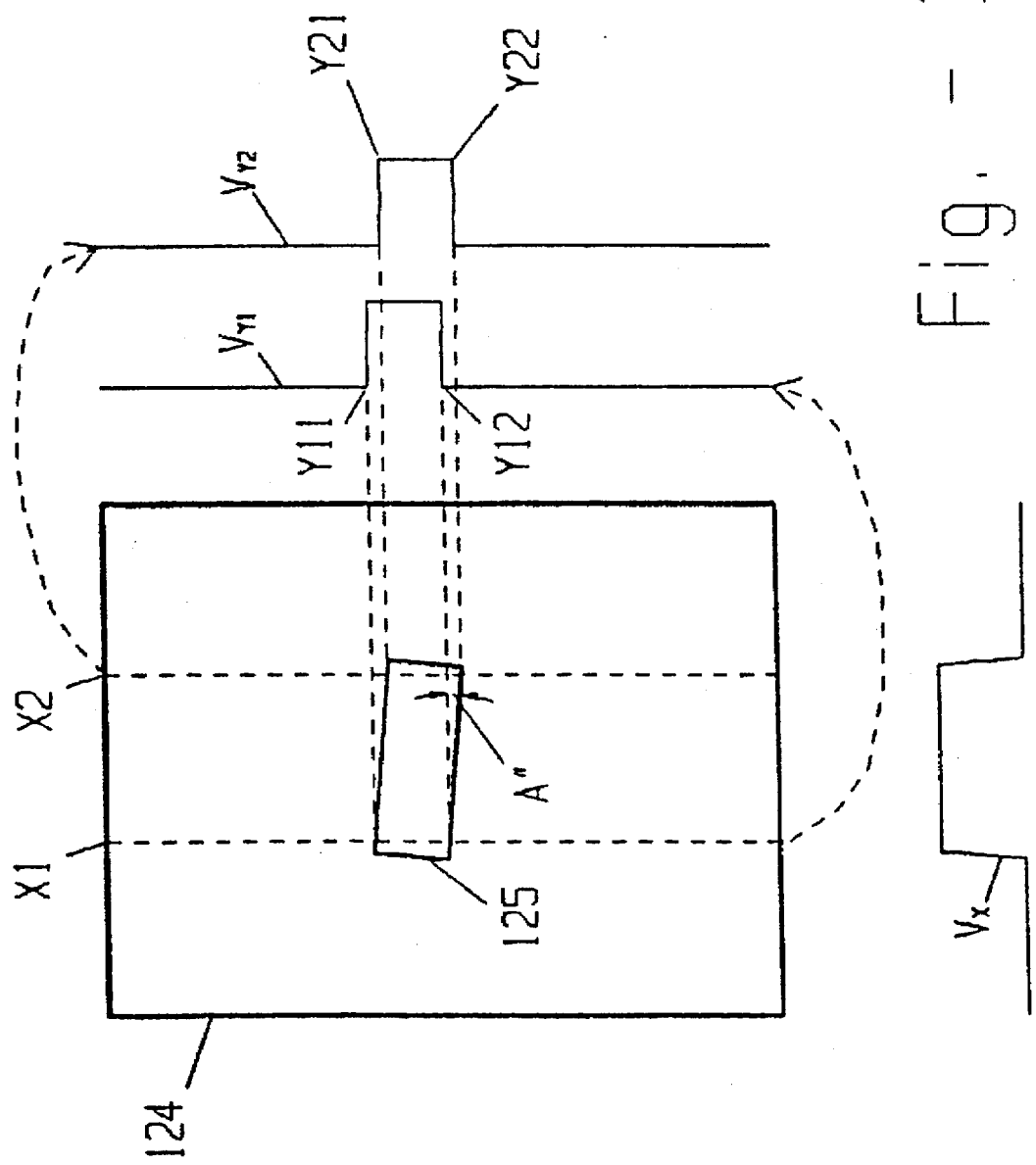
Fig. -13-

AUTOSTEREOSCOPIC IMAGE DISPLAY ADJUSTABLE FOR OBSERVER LOCATION AND DISTANCE

This invention is concerned with the field of three-dimensional imaging and specifically with co-ordinate tracking and single-user display applications in which the position of the observer is used as feedback to the display system.

BACKGROUND

There are various ways of producing a three-dimensional image, in which the viewer's left and right eyes observe different perspectives of the same subject, thus creating a sensation of depth and separation between foreground and background. Some systems are based on providing only two perspectives. In these cases, it is normal to use special eyewear (such as polarising or anaglyphic filters) which transmit the appropriate image to each eye. In another type of system, a continuum or plurality of perspectives, combined in interdigitated form behind a lenticular screen, is projected by this screen, so that in use the viewer effectively only observes two of them (one for each eye), without requiring special eyewear to do so. The viewer may alter his position and observe the subject from a new view point. His range of movement is typically limited to some 20 to 30 degrees around the screen if good image quality is to be maintained, and the depth of field is limited by the ability of the optical system to separate adjacent perspectives and avoid the blurring of them. In a further type of system, the aperture (or pupil) of the image projection optics is relatively large, and relayed, using suitable optical elements to the observer's location. An electro-optic and/or electromechanical shutter arrangement, located near the aperture, allows different perspectives to be sequenced using a single display screen, each perspective only being observable at specific locations in space. For real time applications, multiple perspective (autostereoscopic) systems require very high display bandwidth and complex display apparatus. The prior art contains a number of publications which are relevant to the current invention. One which is particularly relevant is entitled "Head Tracking Stereoscopic Display" (A. Schwartz, IEEE Transactions on Electron Devices, Vol.ED-33 No 8, Aug. 1986, pp. 1123–1127). In the Schwartz system, two CRT's are positioned behind corresponding projection lenses. Each CRT produces one image of a stereo pair, the two being rear projected, at slightly different angles, into the back of a Fresnel lens. This lens acts as a highly directional screen by reimaging the pupils of the two projection lenses to points in space corresponding to the possible respective positions of an observer's eyes. By positioning a lenticular screen with its lenses running horizontally at the Fresnel lens, the images of the projection lens pupils are extended vertically into stripes. An observer may now position himself, at the distance at which these stripes are formed from the viewing screen and observe a stereoscopic image. The observer's left. eye must remain located within the vertical stripe comprising light from the CRT producing the left eye image, whereas the observer's right eye must remain within the stripe corresponding to the other CRT, which provides the image for that eye. To allow the observer freedom of head movement, an infrared detection system is used to detect the position the observer's head, and a servo system controls the lateral position of the Fresnel lens, so that the line joining optical centre to the point half way between the two exit pupils of the projection lenses lies in a vertical plane passing between the observer's eyes.

The Schwartz system works, provided the observer is positioned at the required distance from the Fresnel screen. The distance by which this must be moved is roughly half the lateral movement of the observer. The system is inevitably somewhat bulky and large mechanical movements are required to provide substantial scope for lateral head movement. Furthermore, the horizontal width of the Fresnel lens must exceed the useful image width by this amount or the image itself will be truncated when the observer ranges laterally. The Schwartz system does not lend itself to tracking the observer's distance from the Fresnel screen. If the image formed at this screen is to retain its scale and location, changing the distance of the projection lenses from the Fresnel lens is ruled out. A Fresnel lens or lens combination with variable power would be needed, but this is not disclosed by Schwartz.

The current invention overcomes the limitations of the Schwartz system described above. A compact arrangement of components allows the image light corresponding to the observer's left and right eye to remain located correctly, both for lateral movement of the observer and, in preferred embodiments, also for changes in the observer's distance from the viewing apparatus. The mechanical movements required are very small and, in certain embodiments, may be completely avoided.

A second relevant prior art publication appears in the Proceedings of the SPIE: Stereoscopic Displays and Applications IV, vol.1915, 1 February 1993, San Jose, Calif. U.S., pp. 177–186. The paper was presented by J. B. Eichenlaub and entitled "Developments in Autostereoscopic Technology at Dimension Technologies Inc". On page 180, first paragraph, the demonstration of a head tracking system is reported. This employs alternatively switched light sources to provide a set of overlapping positions at which the left and right eye viewing zones may be formed. Although the system is more compact than that of Schwartz, tracking is accomplished in large discrete steps, leaving very little margin for error, and, as with the Schwartz system, no provision is made for the observer's distance from the screen to vary.

Other prior art having relevance to this invention may be found in U.S. Pat No. 4,649,425 (Pund), EP-A-0 493 651 (Mocker) an EP-A-0 477 888 (Mocker).

Pund describes a system incorporating two CRT's providing, respectively, left and right eye images. These images are relayed to the same image forming region using a semitransparent mirror and projection optics. The image forming region has a relay lens in it, which creates an image of two internal aperturing devices at a viewing plane external to the apparatus. The observer must be located at this plane, when, by movement of the aperturing devices in response to lateral movements of the observer's head, each of the observer's eyes is provided with light from the CRT producing its image, the light from the other CRT being blocked for that eye. The Pund system suffers similar disadvantages to that of Schwartz. It is somewhat bulky and does not provide scope for the observer to alter his distance from the viewing apparatus.

EP-A-0 493 651 and EP-A-0 477 888 (both by Mocker) describes systems for detecting head position. The systems use laser diodes focused onto and/or scanned in a variety of configurations over small retro-reflective features incorporated into or on the surface of a pilot's helmet. The light returned from these precise features can be analysed to compute the pilot's head position, at any instant. Such systems, whilst potentially very accurate, are complex and expensive.

In certain embodiments of the current invention, an extended retro-reflective area, preferably incorporated in the headwear of the observer is used. A simple imaging system, such as a CCD camera provides an image of this extended feature, and this may be analysed to provide position data suitable for the head tracking objectives of the invention.

There are a variety of different methods by which an observer's co-ordinates may be tracked. These include magnetic coil based and ultrasonic detection systems. The position of a one or more coils or a detector or transmitter is determined in three dimensions by measurement of magnitude and phase of a plurality of received signals.

SUMMARY OF THE INVENTION

It is an object of the invention to provide a method for minimising the displayed bandwidth of a three-dimensional image.

It is another object of the invention, in preferred embodiments, to provide an auto-stereoscopic image, by avoiding the need for special eyewear which would impede the viewer's normal vision.

It is a further object of the invention, to provide parallax changes for both horizontal and vertical movement of the observer.

It is yet another object of this invention to provide a simple solid state detector for determining the position of an observer's head co-ordinates in relation to a location which the observer is facing, thereby reducing the headwear worn by such an observer to a practical minimum.

It is yet a further object of the invention to provide a means for locating reference points within a determined field of view of the apparatus.

It is also an object of the invention to utilise the infrared signals used to control the operation of eyewear for stereoscopic viewing, when used by the observer, as a source of illumination for head location.

STATEMENTS OF INVENTION

Thus, according to the present invention there is provided apparatus for the display of autostereoscopic images, comprising means for detecting the location of the head of an observer with respect to a real and/or virtual image forming region; optical means for providing a point or region of concentration of light, said light providing in use an image of at least a first single perspective of a scene at said image forming region, and a void point or region, spaced from said point or region of concentration, substantially void of light from said first single perspective image; means for providing an output signal from the detecting means indicative of the observer's head location; and control means responsive, in use, to said signal and causing the location of the point or region of concentration of light from said first single perspective to substantially track and be co-located with a first eye of the observer, and said void point or region to be co-located with the second eye of the observer.

According to one aspect of the invention the optical means comprises, in combination, a source of light; a lenticular screen having a substantially evenly spaced plurality of juxtaposed lens elements; an apertured surface having a corresponding plurality of light transmitting regions separated by opaque regions and positioned close to the lenticular screen between said screen and said source of light; and means for moving the apertured surface relative to said screen, whereby, in use, the control means positions the point or region of concentration of light corresponding to the perspective image provided by the optical means.

Preferably diffusing means is provided at the focal plane of the lens elements of the lenticular screen.

The apertured surface may be positioned near the focal plane of the lens elements of the lenticular screen and lateral movement of the point or region of concentration of light is provided, in use, by movement in a first direction of said screen relative to the apertured surface in a direction parallel to the plane of said screen.

The distance from the optical means of the point or region of concentration of light may be changed by movement in a second direction orthogonal to the first direction of movement.

Advantageously the optical means comprises a tapered structure in which the pitch between adjacent lens elements of the lenticular screen reduces in a direction orthogonal to the first direction of movement; the transmitting and opaque regions of the apertured surface are arranged in a matching tapered pattern; and the second direction of movement is substantially parallel to the plane of the screen, so that, in use, the pitch of the tapered screen, at a given position relative to the pitch of the nearest portion of said pattern, is altered, whereby the control means controls the convergence of the light of the first perspective image and the distance of the point or region of concentration thereof from the optical means.

The apertured surface may be positioned substantially at the focal plane of the lens elements of the lenticular screen.

Conveniently, a second optical means provides a second point or region of concentration of light from an image of a second single perspective of the scene at the image forming region and a second void point or region, spaced from said second point or region of concentration, substantially void of light from said second single perspective image; said second optical means includes a semitransparent mirror positioned so that, in use, said second perspective image is substantially co-located with the first perspective image, one of said images being a virtual image; and said second optical means is controlled so that, in use, said point or region substantially void of light from said second single perspective image is co-located with the observer's first eye and said point or region of concentration of light of said second perspective image is co-located with the observer's second eye.

Advantageously, a first transparent image generating surface is positioned in the optical path between the means for providing the first point or region of concentration for the first single perspective image and the observer, and a second transparent image generating surface is positioned in the optical path between the means for providing the second point or region of concentration and the observer, so that both the first and second perspective images may be provided simultaneously.

Preferably each image generating surfaces is an LCD panel.

According to another aspect of the invention a first and a second single perspective image of a scene, are projected in positional register but at different angles onto the apertured surface so that the components of said first image transmitted bypositions space surface are projected to positions spaced from the corresponding components of said second image on the diffusing means.

According to a further aspect of the invention the optical means comprises. in combination, a lenticular screen having a substantially evenly spaced plurality of juxtaposed lens elements; an image generating surface having a corresponding first plurality of spaced columns for providing elongate components of the first perspective image of the scene and a second plurality of columns, interleaved with said first plurality, for providing elongate components of a second perspective image of said scene, said surface or an image thereof being located at the focal plane of the lens elements of the lenticular screen, said screen providing, in use, a second point or region of concentration of light, corresponding to said second single perspective image of the scene and a second void point or region, spaced from said second point or region of concentration, substantially void of light from said second single perspective image; and means for moving, in its own plane, said image generating surface or an image thereof relative to said screen, whereby, in use, the control means positions the point or region of concentration of light corresponding to each respective single perspective image provided by said image generating surface.

The means for providing movement typically comprises means for providing a first direction of relative movement, orthogonal to the elongate image components, to control the lateral position of each point or region of concentration of light and means for providing a second direction of relative movement, orthogonal to said first direction, to control the convergence of the image light and thereby the distance of each point or region of concentration of light from the lenticular screen.

Advantageously, the optical means comprises a tapered structure in which the pitch between adjacent lens elements of the lenticular screen reduces in a direction orthogonal to the first direction of movement, the elongate components of each perspective image are arranged in a matching tapered pattern and the second direction of movement is substantially parallel to the plane of said screen, so that, in use, the pitch of the tapered screen, at a given position, relative to the pitch of the nearest portion of said pattern, is altered to control the convergence of the light of each perspective image and the distance of the point or region of concentration thereof from the optical means.

According to another aspect of the invention the optical means comprises a single image generating surface positioned in the image forming region; means for selectively providing, by transmission or generation, light at different positions on an aperture plane spaced from said image generating surface; convergent optical means controlled by the control means, in use, to provide convergence of image light from the image forming region, so that said aperture plane is substantially conjugate to a plane containing the location of the observer; means for alternately generating the first single perspective of a scene and a second perspective thereof with a second point or region of concentration of light corresponding thereto; and means for controlling the light providing means, so that in sequence, the points or regions of concentration of light corresponding to each single perspective image are co-located with each respective eye of the observer.

According to another aspect of the invention the optical means comprises a single image generating surface positioned in the image forming region; area programmable means for providing, by transmission or generation, light at a plurality of discrete locations on a plane spaced from said image generating surface; and means for changing the point or region of concentration of image light corresponding to a perspective image from the image forming region by control of the pattern of transmission or generation of light by said programmable means to correspond to spaced portions of both the first and a second perspective image displayed simultaneously on the image generating surface, so that each of the observer's eyes only sees respectively the correct perspective image portions.

Preferably, the separation between light transmitting or generating regions of the programmable means and the corresponding separation between portions of the same perspective image on the image generating surface are decreased as the observer's distance from the image forming region increases.

Advantageously, the positions of the light transmitting or generating regions of the programmable means are changed over a short time interval, so that the observer sees a contiguous three-dimensional image comprising light substantially from the whole area of said programmable means.

According to another aspect of the invention, apparatus for detecting the location of a marker and/or the head of an observer, comprises a source of infrared radiation; means for imaging the space illuminated by said source; and means for locating, in use, within the image of said space, the image of the marker and/or the head and deriving positional data corresponding thereto.

Preferably, the infrared source is located close to the imaging means and the marker is retro-reflective. This may be part of the observer's headwear. It may consist of one contiguous retro-reflective area. Alternatively, the marker may comprise two or more retro-reflective components arranged in a defined pattern.

Advantageously, the imaging means comprises a lens and a CCD array. The CCD array may be two-dimensional and provide video data. The line scan direction of the video image is, conveniently, arranged to be vertical.

In certain embodiments of the invention each line of video data is integrated to provide positional data along a first axis.

Preferably, the infrared source is modulated in synchronism with the frame rate of the CCD to provide an output signal corresponding to the difference between video data in alternate fields. A blocking filter may be used to remove light outside the range of wavelengths of interest.

Following location of the marker's image in one axis, one or more lines of video data may be selected to comprise data corresponding to the retro-reflective means, whereby a second axis of positional data and/or orientation data can be derived. The width of the image of the retro-reflector is determined to provide its distance from the detecting means, and thus the location of the observer in three dimensions, is derived.

Advantageously, interpolating between intensity values associated with two or more discrete locations on the CCD array provides more accurate positional data.

According to a further aspect of the invention each perspective image is selected in accordance with the location of the observer as provided by the output signal from the detecting means.

In certain embodiments, the pupil of a camera providing an image for viewing by the observer is moved in response to changes in the output signal, or corresponding positional data, to provide movement parallax.

According to another aspect of the invention a field sequential viewing device may be combined with apparatus for detecting the location of a marker and/or the head of an observer, said apparatus comprising a source of infrared radiation; means for imaging the space illuminated by said source, in which the imaging means comprises a CCD array providing video data; the infrared source is modulated; and the frame rate of the CCD and the operation of said field sequential viewing device are synchronised to said modulation.

DESCRIPTION OF PREFERRED EMBODIMENTS

The invention will now be described with reference to FIGS. 1 to 13 in which:

FIG. 1 illustrates a means for detecting the observer's position relative to a viewing screen.

FIG. 2 illustrates a two view display system in which the points of projection of the displayed views may be altered.

FIG. 3 shows diagrammatically a control system for the presentation of image data selected according to the observer's position.

FIG. 4 shows a form of lenticular screen constructed in accordance with the invention.

FIG. 5 shows the light paths in a horizontal section through the arrangement of FIG. 4.

FIG. 6 shows in diagrammatic form, the aperture segmentation of a viewing system constructed in accordance with the invention in which the user's head movement is translated into movement of the entrance pupils of two video cameras.

FIG. 7 shows an arrangement in which CCD arrays provide head tracking data in accordance with the invention.

FIG. 8 shows a display system comprising two conventional LCD panels in accordance with the invention.

FIG. 9 shows in plan a schematic view of a system comprising in combination a monochrome CRT, a colour selection device for field sequential operation and an electro-optic shutter array to provide autostereoscopic images in accordance with the invention.

FIG. 10 illustrates a further embodiment of the invention in which a shutter array is combined with a display screen to provide an auto-stereoscopic display.

FIG. 11 illustrates diagrammatically a co-ordinate detection system in accordance with the invention.

FIG. 12 is a block schematic of a signal processor constructed in accordance with the invention.

FIG. 13 shows diagrammatically one aspect of the way in which data is processed in accordance with the invention to provide co-ordinate data.

Means for detecting and tracking the location of the head of an observer is shown in FIG. 1. The observer 1 is located in front of a display screen 2 (shown as a broken line). The detection and tracking system is located immediately above screen 2. The observer is provided with a small retro-reflective patch or marker 3, which is worn centrally on the forehead, being the only headwear required. An infrared light emitting diode 4 immediately behind a semitransparent mirror 5 emits a wide beam of radiation 6 towards the observer. The retro-reflecting patch 3 returns a much narrower beam 7 to mirror 5. The returned radiation reflected by mirror 5 allows the formation of an image I3 of patch 3 by a lens 8 onto a split photodetector 9R and 9L which portions detect the right and left portions respectively of the image. Mirror 5 is mounted on the vertical shaft of motor 10 (drawn with a dashed line for clarity). As the observer moves laterally, the signal on one half of the detector changes relative to that on the other half. The difference between the two signals is a measure of the distance by which the observer's head location has changed, as the position of image I3 moves accordingly. By rotating mirror 5, this output or error signal can be nulled as part of a closed loop control system, the angular position of the mirror then being a good measure of the observer's position. At any given moment, the angular position of the mirror and/or the relative strength of the signals from left and right detector segments provide a measure of the observer's location.

Optical means, in the form of a display screen for producing two spatially separated but controllable viewing locations, each with a different associated image, is illustrated with the aid of FIG. 2. This is not drawn to scale for the sake of clarity. The observer's eyes, 11R and 11L are located at a distance D in front of a hybrid screen, consisting of a lenticular screen 12 (normally used for multi-perspective images and having an evenly spaced plurality of juxtaposed cylindrical lens elements formed on its front surface) of thickness t and refractive index n placed a distance s in front of a flat display surface 13 with columns of picture elements. The columns are arranged to match the pitch between the lenses of screen 12 and alternate ones R and L are seen respectively by the observer's right and left eyes. Preferably, the focal plane of the lens elements of screen 12 corresponds to the position of surface 13. Two viewing regions (or regions of concentration of image light from each perspective) 14R and 14L, corresponding to the R and L columns respectively, are created as a result of the imaging properties of screen 12. Providing the vertical plane 15 dividing regions 14R and 14L remains between the observer's eyes, the latter will see a stereoscopic image. The angle, shown as near zero for a centrally positioned observer, which plane 15 makes with respect to the normal to screen 12, in practice, is controlled by moving the latter, horizontally in its own plane, relative to display surface 13. In practice, a very small movement 16 of screen 12 produces a substantial movement 17 at the observer's position of plane 15. To a good approximation the ratio of these movements R is given by the equation:

$$R=D/(t/n+s)$$

Using typical values (distances in millimeters) for the parameters involved, D=600, t=3, n=1.5 and s=1, a value for R of 200 is obtained. In this example if the head tracking apparatus of FIG. 1 detects a lateral head movement of 200 mms, a lateral movement of 1 mm of screen 12 relative to the display surface 13 will be sufficient to maintain alignment of the stereoscopic image with the observer. The movement of screen 12 may be effected in a variety of ways, which are not explicitly illustrated. It will be clear that a very simple and direct method is to provide a suitably geared linkage with the rotation of the shaft of motor 10 (FIG. 1). The control means is made to respond to the difference between the outputs of diodes 9R and 9L and thereby to position the viewing zones correctly for stereoscopic viewing.

One particular embodiment of apparatus for locating the correct viewing zones of a stereoscopic image correctly for an observer has been illustrated. Other embodiments in accordance with the invention which achieve the same result are quite practical. One such alternative involves the use of two display screens, one for the left eye image and the other for the right eye image. The two screens are positioned at equivalent locations on either side of a semitransparent mirror, one being seen as a virtual image in the image forming region. Each screen produces a localised viewing zone for its respective eye, which can be achieved in a manner similar to the two view system described above. Each screen is therefore only visible to one of the observer's eyes, where there is a point or region of concentration of the image light corresponding thereto, and the space adjacent to this point of concentration, where the observer's other eye is positioned, is void of light from that perspective view. In other words, the point or region of concentration of light from one perspective view is co-located with the point void of light corresponding to the other perspective view. In this way, the observer sees a stereoscopic image. Such an embodiment is described below with reference to FIG. 8. In this description the phrase "point or region of concentration of light" is used principally to convey the relative strength of light at such points or in such regions, when compared with that at corresponding points or regions substantially void of such light, and need not imply the application of a process by which luminous flux is increased in an absolute sense.

Also in this description, the term periodic structure encompasses a structure having periodic optical elements, such as a lenticular screen having lenses arranged in a regular fashion, a display surface (e.g. an LCD or CRT) having displayed lines or image bands, a barrier strip screen having light passing and light blocking regions., and an area programmable device (e.g. a shutter array) having slit-like apertures arranged in a regular fashion, and can be seen throughout the drawing figures.

Another method of correctly locating the viewing zones at the observer's position is to place a mirror intermediate the two view display system and the observer. By rotating this instead of laterally moving a lenticular screen as described above, the points or regions of concentration of image light from the left and right eye perspective views of a scene (viewing zones) can also be made to track the eyes of the observer, in order to maintain good stereoscopic viewing.

A system for presenting stereoscopic subject matter, the perspective view of which is driven by the observer's position, is shown diagrammatically in FIG. 3. In this example the photo-detector 18 is a four segment device which provides difference signals for vertical and horizontal motion detection by summing the outputs of the quadrants in pairs, either horizontally to provide a differential signal pair for vertical movement, or vice versa. An additional mirror and motor drive 19 is provided to null the vertical error signal and thus track the observer's vertical position. This is not necessary in order to correctly position the two required viewing zones, but does provide the second axis for tracking observer position. Controller 20 receives 4 quadrant detector inputs 21 and provides the control for the angle of the two tracking mirrors and the horizontal actuator 22 for the lenticular screen 23. A further output 24 provides a digital representation of the observer's location to a graphics controller 25. This selects the appropriate views for presentation by the display driver 26 on the flat display 23A. In this manner movement parallax may be provided to the observer with a display bandwidth which is not excessive.

The embodiment of FIG. 2, in which a lenticular screen 12 is used to project left and right eye views generated in conjunction with a matching segmented display surface 13, suffers one limitation, when a conventional lenticular screen is used. This limitation is, for a given ratio (less than 1) of the lenticular spacing to that between alternate display surface segments, that the observer must be positioned within a narrowly defined region a certain distance from the screen.

In FIG. 4, a form of lenticular screen 27 which removes this restriction and is constructed in accordance with this invention is shown. Its essential feature is that it has a tapered structure. The display screen's segmentation has a matched taper. The lines 28, shown as dashed lines behind the lenticular screen represent the boundaries between left SL and right SR eye segments of the displayed image. The display screen comprises a first and second plurality of columns, each plurality providing elongate image components of a respective perspective view. In use, the lenticular screen is moved vertically 29 in its own plane relative to the display screen's segmentation pattern, which is at the focal plane of the lenticular screen's lens elements. This selects, for each element of the displayed image, the appropriate ratio between its segment spacing and that of the lens elements, at the nearest point of the lenticular screen. Such vertical adjustment may be controlled manually to allow the user to select a convenient viewing distance. Alternatively, the observer's distance may be determined by a head tracking arrangement as described with reference to FIGS. 7 or 10 to 11 below, or an alternative method, and the screen's position control means automated.

The geometric limitations imposed by the condition that good autostereoscopic viewing be achieved across the entire width of the displayed image is illustrated in FIG. 5. The lenticular screen pitch and the display screen's segmentation should have a specific ratio for any given viewing distance. Lines 30 represent the projections of two of the boundaries defined by lines 28 in FIG. 4. There are restricted regions of perspective light concentration, VL and VR, at which correct stereoscopic viewing is achieved. Assuming an interocular spacing of 65 mms and the values used previously for the lenticular screen's effective focal length of 3 mms, but varying the viewing distance, the ratio is 0.994 at 500 mms, whereas at 1000 mms it becomes 0.997. If this ratio is not changed, the operating range R for a screen of up to 400 mms width at a viewing distance of 500 mms is, under optimum conditions, ±80 mms, but, allowing in practice for some latitude in left and right eye viewing location separation and lateral positioning, may be as low as ⌞54 mms and that at the 1000 mms distance would, correspondingly, be ±85 mms.

This invention can be applied in many fields. These include both remote handling and virtual reality applications. A particular, form of remote handling occurs in the medical field where closed circuit video cameras are used as a tool so-called "Key hole" or minimally invasive surgery. The surgeon must operate with a video image from a laparoscope in order to see what he is doing. Availability of the third dimension is recognised as a key requirement in order to reduce the risk of errors and to make procedures such as suturing an easier task.

In Patent Application PCT/GB 92/00292 (Street), the principle of segmentation of a large pupil (lens aperture) into smaller regions, each of which provides a slightly different perspective of the subject matter, is described. One pupil segmentation arrangement for a stereoscopic vision system providing some movement parallax for a surgeon whilst performing a surgical procedure is shown diagrammatically in FIG. 6. The exit pupil of the laparoscope is shown as a broken circle 31. The diameter of this pupil is typically 4 mms. At or close to pupil 31 there are two aperturing devices. A narrow horizontal slot is formed by the separation of plates 32 and 33, and two shaped cut-outs 34 and 35 are provided in circular plate 36. A rotate. on A' of plate 36 causes the distance between the two transmitting regions 37 and 38 of the arrangement (hatched for clarity) to change. The two video cameras (not shown) collect light respectively from regions to the left and the right of boundary line 39 which passes through the centre of disc 36. The whole aperturing arrangement of plates 32, 33 and 36 may be moved 40 relative to pupil 31. In an autostereoscopic system constructed in accordance with this invention, the head tracking data is used, both to ensure that the displayed pair of images is projected correctly to the observer's left and right eyes respectively and also to control the rotation of plate 36 for distance from the viewing screen and, for small and/or rapid head movements, the co-ordinates of the transmitting regions 37 and 38 with respect to pupil 31. In this way the effective pupil position of each camera is moved to provide some movement parallax for the observer.

A head tracking detector arrangement providing lateral, vertical and distance data requiring no moving parts and using a retro-reflective patch worn by the user is illustrated in FIG. 7. The reflector 41 is worn by the user 42 as part of his normal headwear. Light from an infrared emitter 43 is directed towards the user via a semitransparent mirror 44. The returned light 45 is imaged by lens 46 after passing through mirror 44. Half of the imaged radiation is directed by beam-splitter 47 through a cylinder lens 48 onto a vertically oriented linear CCD array 49. The remainder forms an image on the horizontally oriented CCD array 50. A second cylinder lens 51 concentrates the infrared light from lens 46 vertically, in the same way that lens 48 performs this function horizontally for array 49. When each CCD is read out in the conventional way, the respective horizontal and vertical location of the images on arrays 50 and 49 are found. The output of CCD 50 is shown as trace 52. Voltage V is plotted against position X along the CCD. The two edges of the wave form correspond to the positions of the two edges of the image of patch 41 formed on the CCD. The greater the distance of the user from the head tracker, the smaller the gap between the rising and falling edges. From these two edges, both lateral position and distance may therefore be derived.

Two linear CCD arrays to provide horizontal and vertical position data have been described. A single two-dimensional CCD and a lens, as used in many video cameras, may be employed to image the space illuminated by the infrared radiation to provide both co-ordinates of the retro-reflector. By synchronised modulation of the infrared diode, alternate fields of the video signal may comprise the scene with and without infrared illumination. By subtraction, only the image of the retro-reflector remains for subsequent position analysis, whilst the scene comprises many irrelevant features. Such an embodiment is described below with reference to FIGS. 11 to 13.

The embodiments described in some detail, so far, have illustrated the use of one image bearing or generating surface or screen comprising both left and right eye image segments. Each has typically been made visible to the observer's appropriate eye by employing a lenticular screen interposed between the observer and the surface comprising the image segments. A system comprising two separate and, in principle, conventional liquid crystal display or LCD panels is described with reference to FIG. 8. Two equivalent optical means comprising lenticular structures serve only to direct the light projected through each panel, or transparent image generating surface, to the observer's corresponding eye, by doing this from behind the image forming elements of each LCD.

Light from source 53 is collected by lens assembly 54 and split in two parts by beam splitter 55. For efficiency this may, optionally (not. illustrated), be a polarising beam splitter and the axes of polarisation may be aligned to those of the input polarisers of the subsequently encountered LCD panels. Light passes via mirrors 56 and 57 to the rear of barrier strip screens 58 and 59 respectively. These typically comprise an apertured surface with alternate transmitting and opaque stripes running vertically with respect to the image to be displayed. Each such barrier strip is positioned close to and at a precisely controlled distance from a diffusing surface at the focal plane of a corresponding lenticular screen. Lenticular screen 60 is in front of barrier strip 58 and lenticular screen 61 is in front of barrier strip 59. For a plurality of lenses on a lenticular screen there is a corresponding plurality of transmitting and opaque regions on its associated barrier strip screen.

Means are provided to move each lenticular and corresponding apertured surface relative to one another in two directions. The lateral position of each lenticular screen relative to its corresponding barrier strip is controlled by cam arrangements 64 and 65 respectively. This first direction of relative movement is in the plane of the lenticular screen. The cams are schematically drawn and are countered by return springs (not shown). The distance between each barrier strip and the diffuser of its corresponding lenticular is controlled by cam arrangements 62 and 63 respectively, which provide a second direction of relative movement, orthogonal to the first. The distance between centres of the transmitting regions of the barrier strip screen is a close match to the distance between centres of the lenticular lens elements. By small lateral movements in the first direction of the lenticular with respect to the striped image formed on its corresponding diffuser by light passing through the barrier screen from the compact light source 53, the direction of the light leaving the front of the lenticular is controlled to arrive in the region of the observer's appropriate eye, after passage through the corresponding LCD panel. The scale of the striped image may be altered slightly to achieve the correct degree of convergence of the projected light to match the observer's distance from the display surface. This is achieved by altering the separation of each barrier strip from the corresponding diffusing surface. As the light from source 53 is diverging, a greater separation results in a larger scale and corresponds to greater convergence of projected light, which moves the concentration of the image light (and the points void of such light) towards the screen providing the observer with a closer viewing point. The two LCD panels 66 and 67 are both observed in the same location, or image forming region, with the aid of a semitransparent mirror 68, but by different eyes. The observer's left eye 69 sees light arriving from panel 67. The right eye 70 receives substantially no light from this panel as the light blocking regions of barrier screen 59 prevent this, forming a region void of light from the left eye perspective image formed on panel 67. Conversely, the observer's right eye 70 does see the virtual image of panel 66 and the left eye 69 does not. Panels 66 and 67 are fed video signals on inputs 71 and 72 respectively. Provided these correspond to the left and right eye images required, good depth perception is achieved.

A variant of the embodiment of FIG. 8 may be constructed in which both the lenticular and barrier strip screens have a tapered structure, in which the pitch between lens elements reduces in a direction orthogonal to the first direction of relative movement and each apertured surface has a matching pattern of alternating transmitting (transparent) and opaque stripes (regions). Such a structure has already been described with the aid of FIGS. 4 and 5. In this case the diffuser may be at the plane of the barrier strip, which in turn can be at the focal plane of its corresponding lenticular screen and is moved in its own plane relative thereto and vertically with respect to the image, in order to change scale. A diffuse source of light such as a conventional back light may then be used instead of a compact source.

The embodiments of FIGS. 2 to 5 and FIG. 8 have illustrated apparatus in which left and right eye images are displayed simultaneously. It is also possible to embody the head tracking principles of this invention in a field sequential display incorporating a single contiguous image forming surface, at which both left and right eye perspectives are generated.

In European Patent Specification No 0118449 (Street) an imaging system is described in which a three-dimensional object space is imaged through a wide aperture to a spaced conjugate image forming region where a three-dimensional image may be observed and recorded. One embodiment of that invention provides for the sequential generation of a series of two-dimensional perspectives of a three-dimensional object by an electronic imaging device, such as the face of a Cathode Ray Tube (CRT). By imaging each of these perspectives to the image forming region through a respective series of adjacent apertures, a three-dimensional image is formed, over a time interval, and may thus be recorded. If the rate of sequencing this series of perspectives is fast enough and repeated say 50 times per second, such a three-dimensional image would be viewable in real time without substantial image flicker.

The current state-of-the-art allows for 400 frames to be provided every second, which provides the opportunity to display a three-dimensional image of reasonable resolution comprising 16 perspective views at a repetition rate of 25 cycles per second. For reasons of image data rate, light efficiency and phosphor decay time, there are difficulties in providing colour at these rates. If field sequential generation of colour is used, with, for example, an LCD colour shutter of the type manufactured by Tektronix Inc. under the brand name NuCOLOR™, a loss of a factor of six in light efficiency may be anticipated when working with polarised light. As the number of perspective views is increased, the amount of light transmitted by the system in unit time reduces in a reciprocal manner. For a seamless three-dimensional image to be observed, one in which there is no perceptible stutter between adjacent perspectives, it is necessary to provide a new view of the subject matter at 2 mm intervals at the viewer's location. At a typical distance of 1 meter from the image forming region, this represents a resolution between adjacent perspectives of 0.115°. Thus, for a totally efficient system, in which both perspective and colour are sequenced and a viewing angle of 30° is to be achieved, the maximum light throughput would be 0.032% of the light available at the image forming surface of the CRT. In practice, the data rate would be unachievable anyway and a tolerable light efficiency would need to be in excess of 1%, given a very high brightness CRT.

The current invention may be used to increase perspective angle resolution and viewing angle, whilst both retaining a relatively high duty cycle in the viewing locations required by the observer and containing the image data bandwidth required. FIG. 9 illustrates such an arrangement of components schematically. A CRT 73 generates a sequence of two-dimensional images or perspective views. A typical image point P on the CRT's spectrally broad phosphor coated surface emits light in Lambertian fashion. Lens components 74, providing the function normally required for TV projection, collimate rays from point P. These rays pass through a colour shutter 75 which selects red, green and blue image components in rapid succession. The rays transmitted by shutter 75 encounter an electro-optic shutter array 76. The function of array 76 is to provide light for viewing by selective transmission thereof at a plane spaced from the image generating surface, acting as an aperture plane. (In embodiments in which this light providing component is behind a transparent image generating surface, it may fulfil the same function by being a light generating surface, such as the face of a CRT.) Array 76 is shown to have two open regions 77 and 78. In practice these are opened sequentially and are not open simultaneously. Lens components 79 refocus the transmitted rays from object point P to form an observable image point P' at the rear surface of lens assembly 80. This comprises a Fresnel component 81 and a varifocal surface 82, shown as a pair of dashed lines at its two extreme radii of curvature. The function of the Fresnel is to image the shutter array 76 to the average distance at which the viewer will be positioned, whereas the power contributed by the surface 82 will allow this to be adjusted, providing the convergent optical means to vary the convergence of image light, so that the plane of the shutter array 76 or aperture plane may be made conjugate to the plane containing the location of the observer. When region 77 of shutter 76 transmits light, the viewer's right eye 83 sees the image of the CRT 73 reformed at Fresnel lens 81. When region 78 is enabled, the left eye 84 will observe the image. A fully autostereoscopic image in colour can be produced in this way by alternately generating left and right eye images with 6 frames of data (3 colours×2 perspectives). The resolution of the shutter array 76 can be high and thus the tracking of the observer's head location can be as accurate as the head tracking subsystem already described allows, without any increase in image data bandwidth. In more sophisticated embodiments of the invention and at the expense of light efficiency, each transmitting region of the shutter array may itself be subdivided into closely spaced perspective viewing regions with the CRT having to display more frames within the total cycle time available. In this way a system with virtually no image lag where image data is driven by the user's head position, for example in Virtual Reality applications, may be constructed. As in previously illustrated embodiments, data provided by the head tracking subsystem 85 is used to control both the lateral location of viewing locations, by selecting the corresponding regions of array 76, and, through a controllable reservoir 86 containing optically clear fluid and actuator 87, the power of surface 82. This, in turn determines the distance from Fresnel lens 81 at which the shutter array is re-imaged. The result is that the plane of array 76 is conjugate to the plane of the observer, providing correct stereoscopic viewing over the whole image area. The sequential transmission of image light at points 77 and 78 provides sequentially the two points or regions of concentration of image light required by the observer's eyes 83 and 84 respectively.

In FIG. 10, a simple auto-stereoscopic display constructed in accordance with this invention is illustrated. This uses a conventional two-dimensional flat CRT screen, monochrome or colour, as the image generating surface, in front of which, in this example spaced by 100 mms, there is a ferro-electric (electro-optic) shutter array 88 similar to that of FIG. 9. There are no other components required in the optical path and the image plane or generating surface could equally well be provided by projection. The screen 89 simultaneously displays alternate vertical bands or spaced portions of the two perspective views to be seen at the left eye location 90 and right eye location 91 respectively of the observer (shown schematically). The shutter array 88 is an area programmable device, programmed to have vertically arranged slit like apertures 92 at equal intervals $S_1$. In the embodiment illustrated it must provide light by transmission at this plurality of spaced discrete locations. A convenient width for each aperture is typically one quarter of this spacing. The head tracker module 93 provides the observer's co-ordinate data to controller 94 and this, in turn arranges the image bands 95 (hatched) of the left perspective view to be positioned relative to apertures 92 so that they are only visible to the observer's left eye 90 (rays 97), whilst bands 96 of the right perspective view are seen by the observer's right eye 91 (rays 98). The positions and width of apertures 92 themselves are also controlled by controller 94. The whole pattern is shifted rapidly between four locations on a pitch of $S_1/4$. The top left hand corner of the pattern at each position is marked respectively as 99A, 99B, 99C and 99D. Over a short time interval, each part of the entire area of array 88 transmits for up to 25% of the time available. For each new arrangement of apertures 92, the selection of image data in, and the positions of, bands 95 and 96 are rearranged in the appropriate pattern. The result is that the observer is presented with a contiguous three-dimensional image without the need to wear special eyewear. In fact, shutter array 88 provides the necessary light blocking function.

The observer's distance V from screen 89 and the spacing D, between array 88 and screen 89, determine the correct values for $S_1$ and the related spacing $S_2$ between the closest but spaced bands of image data for each eye. It will be apparent that, for any finite viewing distance, $S_2$ must be larger than $S_1$ in order to achieve convergence of image light, rays 97 from the left, and rays 98 from the right eye image, towards each respective eye location, 90 and 91, of the observer. There will then be a region void of light, corresponding to one perspective, in locations of concentration of image light, corresponding to the other perspective. For correct convergence, the following relationship applies:

$$S_2 = \frac{S_1 \times V}{(V-D)}$$

Additionally, the magnitude of $S_1$ and thus $S_1$ must be set to ensure that each image band is of the correct width, so that it does not interfere with either the band corresponding to the other eye, as seen through the same aperture, or with that corresponding to the adjacent aperture. Examples of practical values for the 25% duty cycle arrangement illustrated here are as follows:

| V = 500 mms | $S_1$ = 32 mms | $S_2$ = 40.0 mms |
|---|---|---|
| V = 1000 mms | $S_1$ = 16 mms | $S_2$ = 17.8 mms |
| V = 1500 mms | $S_1$ = 8 mms | $S_2$ = 8.6 mms |

As the observer's distance increases then, given a fixed eye spacing of say 65 mms, the values of $S_1$ and $S_2$ must be decreased. In practice, controller 94 arranges the pattern of transmission of array 88 to control both the distance from the display and the lateral position of the required points of concentration of image light of both perspective views for correct auto-stereoscopic viewing. The lateral position is simply controlled by adjusting the relative phase in space at the centre of the image between the pattern of image data and the transmission pattern in front of it.

Given that the screen 89 can be refreshed at a rate of not less than 100 full frames per second, then the complete image is produced 25 times per second. Higher screen refresh rates are possible, but at the expense of image resolution. In certain cases the phosphor decay time and the time of the frame, which conventionally progresses from the top of the image to the bottom, impose awkward timing constraints on the operation of shutter 88. This limitation can be mitigated by subdivision of the shutter array in the vertical direction. Segments at different vertical positions may then be operated, at different times, and remain in phase with the progressive generation and decay of the image. Another alternative is to use a screen with a vertical line scan. Here different apertures are opened, at different times, to remain in phase with the progressive generation of the image from one side of the screen to the other. Another advantage of this arrangement is that the bands of image data corresponding to each eye are composed of complete lines of such data, instead of the arrangement, in which each horizontal line must contain data from both perspective views.

In FIG. 11, a further embodiment of a head location system is illustrated. Imaging means is provided by a two-dimensional CCD array 101, with its read out (scan line) direction arranged vertically, located behind an image forming lens 102. Infrared light or radiation is emitted, in the form of a cone 103 of radiant energy, by a ring of light emitting diodes (LED's) 104A to 104F grouped around lens 102. By positioning the LED's close to lens 102 the latter receives a significant proportion of the light returned a retro-reflective marker 105 located within circle 106, a section through the cone of light 103 at a distance Z from lens 102. The shaded square area within circle 106 corresponds to the shaded portion of CCD 101, where an image 107 of marker 105 is formed. Unwanted radiation from other sources is reduced by filter 108 which blocks visible light.

In use, the co-ordinates of marker 105, worn as part of the headwear of an observer, are determined by analysis and location of the image 107 formed on CCD 101. Up to four degrees of freedom (two positional, one rotation and scale) of marker 105 may be determined in this way, provided the size and shape of the marker are known. The width w of image 107 is ratioed to the known width M of marker 105. The latter's distance Z from lens 102 is given to first order by the following relationship.

$$Z=F(M+w)/w$$

where F is the focal length of lens 102. In practice allowance is made for any image distortions of the camera lens which may require the addition of terms in x and y, where x and y are the co-ordinates of the centre of image 107 with respect to the centre of the shaded area of CCD 101.

The X and Y co-ordinates of the centre of marker 105 with respect to the centre of the shaded area within circle 106 are determined by similar relationships as follows.

$$X=(M/w)x$$

$$Y=(M/w)y$$

A fourth degree of freedom for an observer is rotation (or roll) of the head about the line of sight. This causes the image of the marker to be skewed on the CCD array. The skew angle A" can be derived as described below with the aid of FIG. 13.

FIG. 12 illustrates a typical processing system constructed in accordance with the invention. The infrared light source is modulated in order to extract from the CCD the basic data required to calculate the X, Y and Z co-ordinates of the observer's marker.

The CCD 109 is shown schematically together with the image 110 of marker 111 within its frame. Block 112 represents the group of LED's which emit infrared radiation 113 towards marker 111. Returned radiation 114 forms image 110 through lens 115. The group of LED's 112 is controlled by line 116 from control circuit 117. By synchronising the switching of the LED's to the frame sync received from the CCD on line 118, these are turned on and off during alternate video fields.

In order to establish the horizontal position of the marker's image simply and quickly, the video data is processed by an integrator 119 on a line by line basis in real time, providing data for analysis along a first (horizontal) axis. A voltage corresponding to the total light received on each vertical line is produced and, for the field when the LED's are switched off, the values for all lines are stored in a buffer 120. The flow of data is controlled by switch 121, in turn driven by control circuit 117. The light level for each line, when the LED's 112 are on, is compared with the corresponding value in the previous field when the LED's were off. Comparator 122 performs this simple task and the resultant difference values are processed by a small microprocessor 123. In alternative embodiments the intermediate storage and comparison functions may both be handled within the processor.

By analysis of the integrated and normalised light values for each vertical line of the CCD, the centre x and width w of the marker's image may be determined. These yield respectively the values of X and Z using the relationships already provided.

FIG. 13 illustrates how the integrated signals used for the determination of x and w may be used to select one or more lines of raw video signal and how, from these, the values of y and A" may be provided. CCD 124 has an image 125 of the marker which is inclined at an angle A" to the horizontal. The integrated values of the video signal's vertical scan lines are shown along the horizontal axis as trace $V_x$. The raw video data is extracted for two lines at respective x co-ordinates x1 and x2, both of which are within but near the ends of the marker's image formed on the CCD. There are shown as traces $V_{y1}$ and $V_{y2}$ respectively. Each trace, which is processed in order to remove background biases using alternately illuminated fields in the same way as for the line integrated data, provides a signal which, when analysed, yields centre points for the marker's image. For traces $V_{y1}$ and $V_{y2}$ the respective centre points Y1 and Y2 are as follows $$Y1=(Y11+Y12)/2 \text{ and } Y2=(Y21+Y22)/2$$

Thus, along the second axis of positional data, the vertical position y is given by $$Y=(Y1+Y2)/2$$

The orientation of the marker, angle A", is derived by ratios of differences as follows.

$$\tan(A")=(Y2-Y1)/(X2-X1)$$

These operations may be handled within a microprocessor or in special purpose hardware. When a microprocessor is used, the centre of the image may be located to best precision by using interpolation. A CCD is inherently digital in the spatial domain, that is to say, it usually has discrete photosites (pixels) positioned between 10 and 20 microns apart. With an image forming lens of 5 mms focal length and a 20 micron pixel spacing this translates to a 4 mms quantisation of the coordinate system at 1 meter from the lens, if only discrete pixel positions are allowed. This is the result if a simple threshold is used to determine whether an image is present or absent at any given photosite. A regime which provides greater accuracy uses the analog image intensity values at more than one pixel position to infer the location of the edge of the image of the marker to sub-pixel spacing accuracy by interpolating between these values. A simple algorithm is to assume that image intensity changes in a linear manner between two values which lie either side of the chosen threshold level.

Thus, if $V_L$, the value at one pixel location, lies below the threshold $V_T$ and $V_H$, the value at an adjacent pixel location, is greater than $V_T$, the linearly interpolated position p of the image edge may be derived as follows.

$$p=(V_T-V_L)/(V_H-V_L)$$

where p is less than unity and represents the distance of the image edge as a fractional pixel spacing from the pixel with the lower value in the direction of the pixel of higher value. Not only does this regime produce a more accurate co-ordinate determination, it also avoids edge jitter due to noise on a value which lies close to the chosen threshold.

Specific embodiments of the invention have been described. There are a number of other ways of realising the invention in practice. The marker need not comprise a single contiguous retro-reflecting area as illustrated, but may consist of two or more reflectors positioned in a geometrically precise manner relative to one another. Reflective tape or discreet cat's eye reflectors may be used. The illustrated embodiments show how the position of one retro-reflective marker may be determined within the field of view of a video camera sensitive in the infrared. Other implementations are possible in which the radiation used comprises different wavelengths and different markers preferentially return respectively different wavelengths. In this way the location of different markers may be determined. Alternatively, by using more sophisticated image processing a plurality of markers may be located within one image received over the same spectral range. A fixed set of markers may be used to calibrate the transformation from image co-ordinates to space co-ordinates. Whilst the use of one camera has been described, two or more may be used simultaneously to extend the field of view or to triangulate the position of a marker to very high precision.

Whilst the embodiments described have not required the use of special glasses to view a stereoscopic image, such eyewear may be combined with the infrared head tracking principles described herein. When electro-optically shuttered eyewear controlled by frame synchronised infrared signals is used to provide different left and right eye images, the same infrared source can provide the required illumination for the retro-reflective marker.

A variety of different display technologies may be used in accordance with the current invention. The display surface 13 of FIG. 2 may be a specially constructed LCD panel preferably with back lighting. The surface may comprise light emitting elements such as a light emitting diode or polymer array. Surface 13 may be one on which a first perspective view and a second perspective view of a scene are projected from one or more video projectors located elsewhere. In this case it will be an image of the image generating surface which is focused at the focal plane of the lenticular screen. Two images may be projected through an apertured surface or barrier strip screen, comprising substantially vertically oriented stripes, alternately clear and opaque and at a pitch compatible with that of the lenticular screen. The structure may be tapered as previously described. This apertured surface is placed close to surface 13 which has diffusing properties, between it and the image projectors. By maintaining accurate register between, but choosing different horizontal angles of projection for, the two images, each results in a series of spaced components which become interdigitated on surface 13 in the necessary way to match the pitch of the lenticular screen. The lenticular screen 12 and/or the barrier strip screen are moved to track the observer. A first direction of movement, orthogonal to the elongate elements of the interdigitated image provides left to right control of the viewing point, whereas, convergence of the image light is changed by movement orthogonal to this first direction. Alternatively, the displayed image data may be moved relative to the screen. The means for separating the perspectives at the observer's location need not be lenticular. As already illustrated, other arrangements such as a barrier strip or aperture segmentation may be used.

The principles of this invention may be combined with those described in US Pat. No. 4,641,178 (Street) in which two perspectives of a scene are presented within the bandwidth of a monoscopic colour display, the spectral content of each perspective complementing that of the other at a given instant. By switching this spectral division between perspectives at field rates, an essentially flicker free stereoscopic full colour image is achieved using a conventional display bandwidth. In one embodiment the switching of spectral components between the observer's two eye positions is achieved using an oscillating lenticular structure. By superimposing a suitable bias, in accordance with the current invention, on the average location of such a vibrating lenticular structure, the observer's head location would also be tracked.

In FIG. 10 a particular arrangement is described in which the display screen 89 is positioned behind an area programmable shutter array 88. Typically the display screen will be a CRT or other light emitting image generating surface, such as in an electro-luminescent display, or light emitting polymer. The display screen may, however, be a spatial light modulator such as an LCD panel, providing this is fast enough as it would be in the case of a retro-electric LCD. A separate light source would then be positioned behind the transmitting display panel. When the image generating surface is transparent, it may be placed in front of the area programmable device. Whilst this may be a shutter array in front of a separate light source, it can conveniently comprise a single high brightness CRT, which then becomes an area programmable means for generating light, using the principles of the current invention. In this case $S_1$ must be larger than $S_2$ in order to achieve the correct convergence for the observer. A negative value for D in the formula relating these two values achieves this result. Where as embodiment comprises "a single image generating surface", this does not preclude multiple surfaces for generating the image. These may be in series (transmission), side by side or combined in other ways.

Head tracking for autostereoscopic vision may be achieved in different ways. An alternative to using a retro-reflective patch worn by the observer, is to provide an infrared or other light source as part of the observer's head gear. An image of this source would be formed in the way already described. With more sophisticated image processing, the image of the observer's face could be tracked without any special headwear. Alternatively, other active sources may be used, with suitable detectors. For instance, an ultra-sonic source may be used in conjunction with two or three spaced microphones. Phase and amplitude differences between these detectors will provide a measure of the observer's head position. Head trackers employing three magnetic coils to determine 6 variables of motion (3 position and 3 angles are commercially available.

The applications of this invent on are numerous. These include remote handling, minimally invasive surgery, teleconferencing, computer aided design, visualisation and virtual reality.

I claim:

1. Apparatus for the display of autostereoscopic images, comprising:

means for detecting the location of an observer with respect to an image forming region;

optical means including at least one lenticular screen, for providing for a first and a second eye of the observer respective regions of concentration of light, the light of a first region of concentration providing, in use, an image of a first single perspective of a scene at said image forming region, said first region of concentration being adjacent to a corresponding first region substantially void of light from said first perspective image, and the light of a second region of concentration providing, in use, an image of a second single perspective of said scene at said image forming region, said second region of concentration being adjacent to a corresponding second region substantially void of light from said second perspective image;

means for providing an output signal from the detecting means indicative of the observer's location; and control means responsive, in use, to said signal and causing the locations of said first and second regions of concentration of light to substantially track and be co-located respectively with the first and the second eye of the observer, and the locations of said first and second void regions to be co-located respectively with the second and the first eye of the observer, wherein the at least one lenticular screen has a substantially evenly spaced plurality of juxtaposed lens elements constituting a first periodic structure; and the optical means includes a second periodic structure, the combination of said first structure and said second structure providing, in use, at least one of said first and said second regions of concentration of light and said corresponding void regions; and further wherein the control means includes means for moving said lenticular screen in a first direction relative to said second periodic structure, whereby said control means positions the region of concentration of light corresponding to each respective perspective image to provide tracking.

2. Apparatus as claimed in claim 1, wherein the lens elements are cylindrical and the first direction of movement of a first one of said at least one lenticular screen relative to the second periodic structure is substantially orthogonal to the cylindrical axes of said screen's lens elements, and a change of the distance from the image forming region of the respective region of concentration of light is provided by movement of said first screen in a second direction relative to said second periodic structure by a second means for moving, said second direction being substantially orthogonal to said first direction of movement.

3. Apparatus as claimed in claim 1, wherein the means for detecting the location of the observer includes:

a source of infrared radiation; means for imaging the space illuminated by said source and for providing image data; and means arranged for locating, in use, within the image data of said space, the image of a marker borne by the observer and to derive positional data corresponding to the located marker image, said locating means being arranged to acquire image data periodically from the imaging means, and said source being modulated, in use, so that an output signal is derived by the locating means from the difference between image data acquired during consecutive periods.

4. Apparatus as claimed in claim 1, further comprising:

at least one camera for viewing an area and for providing at least one of the first and the second perspective images for viewing by the observer; and means for moving the position of an entrance pupil of said camera with respect to said scene in response to the output signal, whereby movement parallax is provided.

5. Apparatus as claimed in claim 1, wherein the second periodic structure includes an image generating surface having a corresponding first plurality of spaced columns for providing elongate components of the first perspective image of the scene, and a second plurality of columns, interleaved with said first plurality of spaced columns, for providing elongate components of the second perspective image of said scene, said image generating surface being located at the focal plane of the lens elements of the lenticular screen.

6. Apparatus as claimed in claim 5, wherein the means for moving provide a second direction of relative movement between said lenticular screen and said second periodic structure, said second direction being substantially orthogonal to said first direction, to control convergence of the image light leaving the lenticular screen, thereby controlling the distance of the first and the second regions of concentration of image light from said lenticular screen.

7. Apparatus as claimed in claim 6, wherein the lenticular screen includes tapered lens elements in which the pitch between adjacent lens elements of said lenticular screen reduces in a direction orthogonal to the first direction of movement; the first and second plurality of spaced columns, in use, being arranged in a tapered pattern matching the taper of the tapered lens elements; and the second direction of movement is substantially parallel to the plane of said lenticular screen, so that, in use, the pitch between the tapered lens elements at a given position, relative to the pitch of the nearest portion of said tapered pattern, is altered, whereby the control means controls convergence of the light of each perspective image and the distance of the respective region of concentration of light from the image forming region.

8. Apparatus for the display of autostereoscopic images, comprising:

means for detecting the location of an observer with respect to an image forming region;

optical means for providing, for a first and a second eye of the observer, respective regions of concentration of light, the light of a first region of concentration providing, in use, an image of a first single perspective of a scene at said image forming region, said first region of concentration being adjacent to a corresponding first region substantially void of light from said first perspective image, and the light of a second region of concentration providing, in use, an image of a second single perspective of said scene at said image forming region, said second region of concentration being adjacent to a corresponding second region substantially void of light from said second perspective image;

means for providing an output signal from the detecting means indicative of the observer's location; and control means responsive, in use, to said output signal and causing the locations of said first and second regions of concentration of light to substantially track and be co-located respectively with the first and the second eyes of the observer, and the locations of said first and second void regions to be co-located respectively with the second and the first eyes of the observer, wherein the detection means is arranged to measure a viewing distance of the observer, and the control means is arranged to control the distance of the regions of concentration of light from said image forming region to correspond, in use, to said measured distance and to leave the scale of the image provided at said image forming region substantially unaltered by said control of distance.

9. Apparatus as claimed in claim 8, wherein the optical means includes first and second periodic structures, the combination of said first and second periodic structures providing, in use, at least one of the first and the second regions of concentration of light and providing at least one of said corresponding void regions; and at least one of the location and phase of said first periodic structure being varied by said control means relative to the corresponding location or phase of said second periodic structure, whereby tracking is achieved.

10. Apparatus as claimed in claim 9, further comprising a source of light, wherein the second periodic structure includes an apertured surface having a plurality of light transmitting regions separated by opaque regions, said plurality corresponding in number to a plurality of substantially evenly spaced lens elements of at least a first lenticular screen, said first lenticular screen constituting the first periodic structure, and said apertured surface being positioned in the proximity of said lenticular screen between said screen and said source of light.

11. Apparatus as claimed in claim 10, further comprising diffusing means at a focal plane of the lens elements of the first lenticular screen.

12. Apparatus as claimed in claim 11, further comprising projection means for providing the first and second single perspective images of a scene, arranged so that, in use, each said image is projected substantially in positional register with respect to the other and at respectively different angles onto the second periodic structure so that, in use, the components of said first image transmitted by the said second periodic structure are projected to positions spaced from the corresponding components of said second image on the diffusing means at the focal plane of the lens elements of the first lenticular screen.

13. Apparatus as claimed in claim 12, wherein the control means includes moving means for moving said first lenticular screen and said second periodic structure relative to one another in two directions, the two directions being substantially orthogonal to each other.

14. Apparatus as claimed in claim 13, wherein the two directions include a first direction and a second direction, and further wherein the lens elements of the first lenticular screen include tapered lens elements having pitches measured in the first direction, the pitch between adjacent lens elements reducing with increased distance in the second direction.

15. Apparatus as claimed in claim 14, wherein the light transmitting regions and the opaque regions of the apertured surface are arranged in a tapered pattern matching the tapered lens elements, and further wherein the second direction of movement is substantially parallel to a plane of the first lenticular screen thereby altering, in use, the pitch of the tapered lens element relative to the pitch of an aligned portion of said tapered pattern.

16. Apparatus as claimed in claim 10, wherein the apertured surface is positioned near the focal plane of the lens elements of the first lenticular screen.

17. Apparatus as claimed in claim 16, wherein the first lenticular screen includes a tapered lens structure in which a pitch between adjacent lens elements of said first screen reduces in a direction orthogonal to the first direction of movement.

18. Apparatus as claimed in claim 17, wherein the second periodic structure includes an apertured surface having a plurality of light transmitting regions separated by opaque regions and arranged in a tapered pattern matching that of the first lenticular screen; and the second direction of movement is substantially parallel to the plane of the screen, so that, in use, the pitch of the tapered first lenticular screen, at a given position, relative to the pitch of the nearest portion of said pattern, is altered, whereby the control means controls convergence of the light of each respective perspective image and the distance of the respective region of concentration thereof from the image forming region.

19. Apparatus as claimed in claim 18, wherein the apertured surface is positioned substantially at the focal plane of the lens elements of the tapered first lenticular screen.

20. Apparatus as claimed in claim 9, wherein the optical means further includes:
- a single image generating surface in the image forming region, for displaying alternating portions of the first and second perspectives of said scene at a first spacing; and
- area programmable means, spaced from said image generating surface, for providing image light of the first and second perspectives at a plurality of discrete locations on a plane spaced from said image generating surface;
- wherein the single image generating surface constitutes the first periodic structure and the area programmable means constitutes the second periodic structure, and the control means changes the location of the region of concentration of image light corresponding to one of the perspective images by controlling, in use, a pattern of of the image light transmitted by said area programmable means so as to correspond to the spacing of the first and second perspective images displayed on the image generating surface, wherein a separation between the discrete locations of the area programmable means and the first spacing are changed with respect to one another based upon the observer's detected viewing distance so that each of the observer's eyes only sees the respectively correct perspective image portions.

21. Apparatus as claimed in claim 20, wherein the discrete locations of the area programmable means are selected, over a time interval in use, so that the observer sees a three-dimensional image comprising light substantially from the whole area of said area programmable means.

22. Apparatus as claimed in claim 8, further comprising a semitransparent mirror positioned so that, in use, the image of the first single perspective is substantially co-located with the image of the second single perspective, at least one of said first and second perspective images being a virtual image.

23. Apparatus as claimed in claim 22, further comprising:
- a first transparent image generating surface positioned in the optical path between the means for providing the region of concentration for the first single perspective image and the observer;
- a second transparent image generating surface positioned in the optical path between the means for providing the second region of concentration and the observer; and
- means for providing said first and second perspective images substantially simultaneously in use, by respective operation of both said first and second image generating surfaces.

24. Apparatus as claimed in claim 23, wherein each of the image generating surfaces comprises an LCD panel.

25. Apparatus as claimed in claim 22, further comprising light splitting means positioned in the optical path between a light source and each of two perspective image generation means, whereby the same light source provides light for both the first and the second single perspective images.

26. Apparatus as claimed in claim 8, wherein the optical means includes:
- a single image generating surface positioned in the image forming region;
- light providing means for selectively providing image light at different positions on an aperture plane spaced from said image generating surface;
- convergent optical means controlled by the control means, in use, to provide convergence of the image light from the image forming region, so that said aperture plane is substantially conjugate to a plane containing the observer; and
- first means, periodic in time, for alternately generating the first and second perspective images;
- wherein the light providing means operates under control of the control means to be periodic in time such that the image light provided at the different positions on the aperture plane is concentrated to the regions of concentration of light corresponding to said first and second single perspective images.

27. Apparatus for detecting the location of a marker borne by an observer, comprising:
- a source of infrared radiation;
- imaging means for imaging the space illuminated by said source and for providing image data; and
- locating means for locating, in use, within the image data of said space, the image of the marker and deriving positional data corresponding to the located marker image,
- wherein said locating means is arranged to acquire image data from the imaging means periodically and said source is arranged to switch synchronously with the period so that, in use, an output signal is derived by said locating means from the difference between image data acquired during consecutive periods.

28. Apparatus as claimed in claim 27, wherein the marker includes one continuous retro-reflective area and forms part of the observer's headwear, and wherein the infrared source is located in the proximity of the imaging means.

29. Apparatus as claimed in claim 27 wherein the imaging means includes a lens and a CCD array.

30. Apparatus as claimed in claim 29, wherein the CCD array is two-dimensional and, in use, provides video data.

31. Apparatus as claimed in claim 30 wherein the locating means integrates video data to provide positional data long a first axis.

32. Apparatus as claimed in claim 30, wherein a line scan direction of the CCD is arranged to be vertical.

33. Apparatus as claimed in claim 30, wherein, in use, at least one line of the video data is selected to provide co-ordinate data for determining at least one of positional data and orientation data corresponding to the located retro-reflective area.

34. Apparatus as claimed in claim 29, wherein the periodicity of the acquisition of image data is based upon a frame rate of the CCD.

35. Apparatus as claimed in claim 29, further comprising means for interpolating between intensity values associated with at least two discrete locations on the CCD array.

36. Apparatus as claimed in claim 27, wherein, in use, the locating means determines the size of the image of the marker, whereby the marker's distance from the detecting means and thus the location of the observer in three dimensions, is derived.

37. Apparatus as claimed in claim 27 further comprising a field sequential viewing device,
- wherein the imaging means includes a CCD array for providing video data; and further wherein a frame rate of the CCD array, the operation of said field sequential viewing device and a switching modulation of said source are synchronized.

38. A method for displaying autostereoscopic images, comprising the steps of:

locating a viewing location of an observer and outputting a location signal indicative of the viewing location;

providing for a first and a second eye of the observer respective regions of concentration of light, the light of a first region of concentration providing an image of a first single perspective of a scene from an image forming region, said first region of concentration being adjacent to a corresponding first region substantially void of light from said first perspective image, and the light of a second region of concentration providing an image of a second single perspective of said scene from said image forming region, said second region of concentration being adjacent to a corresponding second region substantially void of light from said second perspective image; and controlling, in response to the location signal, the locations of said first and second regions of concentration of light to substantially track and be co-located respectively with the first and the second eye of the observer, and controlling the locations of said first and second void regions to be co-located respectively with the second and the first eye of the observer, the providing step including the substeps of:

providing at least one lenticular screen having a substantially evenly spaced plurality of juxtaposed lens elements constituting a first periodic structure, and providing a second periodic structure for cooperating with the lenticular screen to supply at least one of said first and second regions of concentration of light and said corresponding void regions, and the control steps including the substep of:

moving said lenticular screen in a first direction relative to said second periodic structure, thereby positioning the supplied region of concentration of light to provide tracking.

39. A method as claimed in claim 38, further comprising the steps of:

providing a source of light;

positioning an apertured surface, having a plurality of light transmitting regions separated by opaque regions, in the proximity of the lenticular screen between said screen and said source of light, said apertured surface constituting the second periodic structure and said plurality of transmitting regions having one-to-one correspondence with elements of the lenticular screen.

40. A method for displaying autostereoscopic images comprising the steps of:

locating a viewing location of an observer and providing an output signal indicative of the viewing location;

providing for a first and a second eye of the observer respective regions of concentration of light, the light of a first region of concentration providing an image of a first single perspective of a scene from an image forming region, said first region of concentration being adjacent to a corresponding first region substantially void of light from said first perspective image, and the light of a second region of concentration providing an image of a second single perspective of said scene from said image forming region, said second region of concentration being adjacent to a corresponding second region substantially void of light from said second perspective image; and causing, responsive to said output signal, the locations of said first and second regions of concentration of light to substantially track and be co-located respectively with the first and the second eye of the observer, and causing the locations of said first and second void regions to be co-located respectively with the second and the first eye of the observer, wherein said locating step includes measuring a first distance to the observer's viewing location; and said causing step includes controlling a second distance to the regions of concentration of light to correspond to said first distance; and leaving the scale of the scene provided at said image forming region substantially unaltered by said control of distance.

41. A method as claimed in claim 40 wherein said controlling step further includes:

combining a first and a second periodic structure to provide at least one of the first and the second regions of concentration of light and the corresponding void regions; and varying at least one of the location and phase of said first periodic structure relative to the corresponding location or phase of said second periodic structure, to achieve tracking.

42. A method as claimed in claim 41, further comprising the steps of:

positioning a single image generating surface in the image forming region, the image generating surface for displaying alternating portions of the first and second perspectives of the scene at a first spacing, thereby constituting the second periodic structure;

positioning area programmable means, constituting the first periodic structure, at a plane spaced from said image generating surface, the area programmable means providing image light of the first and second perspectives at a plurality of discrete locations;

controlling a pattern of the image light provided by said area programmable means; and modifying a separation between the discrete locations of the area programmable means and the first spacing with respect to one another based upon the observer's viewing location so that each of the observer's eyes only sees the respectively correct perspective image portions.

43. A method for locating the head of an observer, comprising the steps of:

illuminating a space with a source of radiation;

periodically acquiring an image of said space;

locating, within said image, the image of said head and deriving positional data corresponding to the located image; and switching said source synchronously with the acquiring periods and deriving an output signal from a difference between the image data acquired during consecutive periods.

44. The method of claim 43, wherein said illuminating step includes illuminating the space with infrared radiation.

45. A display apparatus comprising:

an image source extending in at least a first direction, said image source providing a plurality of first and second light components alternately provided along the first direction; and a first optical structure having a plurality of first periodic optical elements, each optical element extending in a second direction substantially orthogonal to the first direction, said first optical structure being displaceable relative to said image source in a direction orthogonal to the second direction, the plurality of optical elements operating to direct the first light components to a first imaging location and the second light components to a second imaging location;

observer location detecting means for detecting a location of an observer; and movement control means, operatively connected to said observer location detecting means, for displacing said first optical structure relative to said image source such that the first and second imaging locations follow and are co-located with respective eyes of the observer.

46. The apparatus of claim 45, wherein said image source is an active source of light.

47. The apparatus of claim 46, wherein said image source includes:

a plurality of picture elements, the picture elements forming the alternating first and second light components.

48. The apparatus of claim 45, wherein the second light components are not visible from the first imaging location and the first light components are not visible from the second imaging location.

49. The apparatus of claim 45, wherein said first optical structure is a lenticular array.

50. The apparatus of claim 45, wherein the plurality of optical elements is a plurality of lens elements.

51. The apparatus of claim 50, wherein the plurality of lens elements is tapered such that a pitch in the first direction between adjacent lens elements reduces as considered along the second direction.

52. The apparatus of claim 51, wherein said image source is two-dimensional and includes:

a plurality of tapered first and second image lines respectively constituting the first and second light components, the first and second image lines extending generally in the second direction, a taper of the tapered image lines matching a taper of the lens elements, wherein said first optical structure is displaceable relative to said image source along the second direction in order to adjust a distance from said first optical structure to the first and second imaging locations.

53. The apparatus of claim 45, wherein said observer location detecting means detects a lateral location of the observer and a distance to the observer, such that said movement control means relatively displaces said first optical structure with respect to said image source in the first and second directions based upon the detected lateral location and the detected distance.

54. The apparatus of claim 53, wherein said observer location detecting means directly detects the lateral location of and the distance to the observer's head.

55. The apparatus of claim 45, wherein said first optical structure is a first periodic structure, said apparatus further comprising:

a second periodic structure having light passing regions and light blocking regions, said second periodic structure arranged adjacent said first periodic structure such that the light blocking regions block light of the first light components from reaching the first imaging location, and the light passing regions allow light of the second light components to reach the second imaging location.

56. The apparatus of claim 55, further comprising:

a first liquid crystal device arranged in the optical path between said image source and the first and second imaging locations, said first liquid crystal device receiving back light from the second light components.

57. The apparatus of claim 56, wherein said image source is a first image source, said apparatus further comprising:

a second image source extending in at least a third direction, said second image source providing a plurality of third and fourth light components alternately provided along the third direction;

at least a second optical structure having a plurality of periodic optical elements, each optical element of said second optical structure extending generally in a fourth direction orthogonal to the third direction, said second optical structure being displaceable relative to said second image source in a direction generally orthogonal to the fourth direction, the plurality of optical elements of said second optical structure operating to direct the third light components to the first imaging location and the fourth light components to the second imaging location, wherein said second optical structure constitutes a third periodic structure;

a fourth periodic structure having light passing regions and light blocking regions, said fourth periodic structure arranged adjacent said third periodic structure such that the light blocking regions of said fourth periodic structure block the fourth light components from reaching the second imaging location, and the light passing regions of said fourth periodic structure allow the third light components to reach the first imaging location; and a second liquid crystal device arranged in the optical path between said second image source and the first and second imaging locations, said second liquid crystal device receiving back light from the third light components.

58. The apparatus of claim 57, wherein one of the first and second directions intersects one of the third and fourth directions, said apparatus further comprising:

a semi-transparent mirror arranged such that one of the second and third light components pass through said mirror to the corresponding second or first imaging location, and such that the other of the second and third light components are reflected by said mirror to the corresponding second or first imaging location.

59. The apparatus of claim 57, wherein said first and second image sources provide respective light beams, said apparatus further comprising a point light source and a beam-splitter for producing the respective light beams.

60. The apparatus of claim 57, wherein the periodic elements of said first periodic structure are tapered at a first taper, and the light passing and light blocking regions of said second periodic structure are tapered at a second taper substantially matching the first taper, and further wherein the periodic elements of said third periodic structure are tapered at a third taper, and the light passing and light blocking regions of said fourth periodic structure are tapered at a fourth taper substantially matching the third taper.

61. The apparatus of claim 60, wherein the first taper substantially matches the third taper.

62. The apparatus of claim 57, wherein said movement control means relatively displaces said first and second periodic structures and relatively displaces said third and fourth periodic structures so that the first and second imaging locations remain respectively co-located with the eyes of the observer.

63. The apparatus of claim 62, wherein said observer location detecting means detects a distance to the observer, said movement control means relatively displacing said first and second periodic structures and relatively displacing said third and fourth periodic structures based upon the detected distance.

64. The apparatus of claim 63, wherein said movement control means changes a distance between said first and second periodic structures and a distance between said third and fourth periodic structures based upon the detected distance.

65. An apparatus for directing an image toward first and second viewing positions, comprising:

a periodic structure arranged between the image and the first and second viewing positions, said periodic structure including a plurality of apertures separated by light-blocking portions, each aperture extending in a first direction, the first and second viewing positions being located relative to one another in a second direction orthogonal to the first direction; and a controller for displacing the apertures in the second direction.

66. The apparatus of claim 65, further comprising:

a display device for displaying the image, the image including a plurality of first image bands and second image bands alternating along the second direction, the first and second image bands extending in the first direction, wherein the first image bands are viewable at the first viewing position through the apertures and are blocked from view at the second viewing position by the light-blocking portions, and the second image bands are viewable at the second viewing position through the apertures and are blocked from view at the first viewing position by the light-blocking portions.

67. The apparatus of claim 66, wherein a first pitch exists between the first and second image bands on said display device, a second pitch exists between adjacent apertures on said periodic structure, and said display device is operatively connected to said controller, said apparatus further comprising:

detecting means for detecting a distance of an observer relative to said apparatus, said controller relatively adjusting the first pitch and the second pitch with respect to each other based upon the detected distance, thereby controlling a distance to the first and second viewing positions.

68. The apparatus of claim 65, wherein said periodic structure includes a ferroelectric shutter array, said controller controlling said ferroelectric shutter array to sequentially displace each aperture in the second direction to an adjacent discrete position.

69. The apparatus of claim 63, wherein the apertures are elongated slits.

* * * * *

UNITED STATES PATENT AND TRADEMARK OFFICE
CERTIFICATE OF CORRECTION

PATENT NO : 5,712,732
DATED : January 27, 1998
INVENTOR(S): Graham S.B. STREET

It is certified that error appears in the above-identified patent and that said Letters Patent is hereby corrected as shown below:

Column 22, line 56-60,

Please amend the claims as follows:

17. Apparatus as claimed in claim 2, wherein the first lenticular screen includes a tapered lens structure in which a pitch between adjacent lens elements of said first screen reduces in a direction orthogonol to the first direction of movement.

Signed and Sealed this

Fifteenth Day of June, 1999

*Attest:*

Q. TODD DICKINSON

*Attesting Officer*  Acting Commissioner of Patents and Trademarks